United States Patent
Horn et al.

(10) Patent No.: US 11,848,803 B2
(45) Date of Patent: Dec. 19, 2023

(54) TECHNIQUES FOR PRE-EQUALIZATION REPORTING

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/152,602

(22) Filed: Jan. 19, 2021

(65) Prior Publication Data

US 2022/0231890 A1 Jul. 21, 2022

(51) Int. Cl.
*H04L 25/03* (2006.01)
*H04W 72/21* (2023.01)

(52) U.S. Cl.
CPC ....... *H04L 25/03343* (2013.01); *H04W 72/21* (2023.01); *H04L 2025/0349* (2013.01)

(58) Field of Classification Search
CPC ......... H04L 25/03057; H04L 25/03885; H04L 27/01; H04L 7/0058; H04L 7/0087; H04L 2025/0349; H04W 72/21
USPC ........................................................ 375/233
See application file for complete search history.

(56) References Cited

U.S. PATENT DOCUMENTS

| | | | | |
|---|---|---|---|---|
| 2002/0025783 A1* | 2/2002 | Futagi | ............... | H04L 25/03343 455/67.11 |
| 2008/0181285 A1* | 7/2008 | Hwang | ................ | H04B 7/0452 375/148 |
| 2013/0022090 A1* | 1/2013 | Weng | ................ | H04L 25/03343 375/219 |
| 2013/0051442 A1* | 2/2013 | Cooper | ............. | H04L 25/03885 375/232 |
| 2013/0259111 A1* | 10/2013 | Harman | ............. | H03H 21/0012 375/232 |

(Continued)

FOREIGN PATENT DOCUMENTS

GB 2362077 A 11/2001

OTHER PUBLICATIONS

International Search Report and Written Opinion—PCT/US2021/064344—ISA/EPO—dated Apr. 14, 2022.

*Primary Examiner* — Syed Haider
(74) *Attorney, Agent, or Firm* — Dalei Dong

(57) ABSTRACT

Methods, systems, and devices for wireless communications are described. A first device (e.g., user equipment (UE), base station) may determine a condition of a channel between the first device and a second device (e.g., UE, base station). The first device may apply pre-equalization to the signal based on one or more pre-equalization parameters. The one or more pre-equalization parameters may be based on the condition of the channel. The first device may transmit, to the second device, or a third device (e.g., UE, base station), or both, a report indicating the one or more pre-equalization parameters associated with the pre-equalized signal. The first device may transmit, to the second device, the pre-equalized signal over the channel. The second device may decode the pre-equalized signal based on the report. The third device may receive the pre-equalized signal and perform interference cancelation procedures to the pre-equalized signal based on the report.

30 Claims, 16 Drawing Sheets

(56) References Cited

U.S. PATENT DOCUMENTS

| | | | |
|---|---|---|---|
| 2016/0204822 A1* | 7/2016 | Yu | H04B 1/40 |
| | | | 375/219 |
| 2019/0173566 A1* | 6/2019 | Tandai | H04B 7/15571 |
| 2019/0222296 A1* | 7/2019 | Khandani | H04B 7/1555 |
| 2021/0175949 A1* | 6/2021 | Ahmed | H04L 27/26025 |

* cited by examiner

TECHNIQUES FOR PRE-EQUALIZATION REPORTING

FIELD OF DISCLOSURE

The present disclosure, for example, relates to wireless communications, including techniques for pre-equalization reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a first device, such as a user equipment (UE) or a base station, may be configured to transmit one or more signals to a second device (e.g., UE, base station) via a channel between the first device and the second device. In some cases, the signal may be impacted due to the environment (e.g., a multi-path environment) in which the signal is transmitted, such that the signal received by the second device may be different than the signal transmitted by the first device. Conventional methods for mitigating such environmental impacts on a signal may be improved.

SUMMARY

The described techniques relate to improved methods, systems, devices, and apparatuses that support techniques for pre-equalization reporting. Generally, the described techniques provide for enhanced methods for communicating via pre-equalized signals. A first device (e.g., a user equipment (UE), and base station) may determine a condition of a channel between the first device and a second device (e.g., UE, base station), where the first device may be scheduled to transmit a signal to the second device over the channel. To mitigate the impact of the channel on the signal, the first device may apply pre-equalization to the signal based on one or more pre-equalization parameters, where the one or more pre-equalization parameters may be based on the conditions of the channel. The first device may transmit, to the second device, a report indicating the one or more pre-equalization parameters associated with the pre-equalized signal, and the first device may transmit, to the second device, the pre-equalized signal over the channel. The second device may decode the pre-equalized signal based on the one or more pre-equalization parameters included in the report to determine the original (non-pre-equalized) signal to determine the information included in the signal.

In some cases, a third device (e.g., UE, base station) may be a neighboring device to the first device, or the second device, or both, and/or may be in communications with the first device such that the third device may receive (e.g., intentionally via scheduling, or unintentionally via interference) the pre-equalized signal that is pre-equalized based on the channel between the first device and the second device. As such, prior to transmitting the pre-equalized signal, the first device may transmit, to the third device, a report indicating the one or more pre-equalization parameters associated with the pre-equalized signal. As such, if the third device receives the pre-equalized signal, the third device may perform one or more interference cancellation procedures for interference corresponding to the pre-equalization of the signal, that may, for example, allow the third device to determine the original (non-pre-equalized) signal. The one or more interference cancellation procedures may be based on the report.

A method for wireless communications at a first device is described. The method may include determining a condition of a channel between the first device and a second device, where the first device is scheduled to transmit a signal to the second device over the channel, applying pre-equalization to the signal based on one or more pre-equalization parameters, the one or more pre-equalization parameters being based on the condition of the channel, transmitting, to the second device, a report indicating the one or more pre-equalization parameters associated with the pre-equalized signal, and transmitting, to the second device, the pre-equalized signal over the channel.

An apparatus for wireless communications at a first device is described. The apparatus may include a processor, memory in electronic communication with the processor, and instructions stored in the memory. The instructions may be executable by the processor to cause the apparatus to determine a condition of a channel between the first device and a second device, where the first device is scheduled to transmit a signal to the second device over the channel, apply pre-equalization to the signal based on one or more pre-equalization parameters, the one or more pre-equalization parameters being based on the condition of the channel, transmit, to the second device, a report indicating the one or more pre-equalization parameters associated with the pre-equalized signal, and transmit, to the second device, the pre-equalized signal over the channel.

Another apparatus for wireless communications at a first device is described. The apparatus may include means for determining a condition of a channel between the first device and a second device, where the first device is scheduled to transmit a signal to the second device over the channel, means for applying pre-equalization to the signal based on one or more pre-equalization parameters, the one or more pre-equalization parameters being based on the condition of the channel, means for transmitting, to the second device, a report indicating the one or more pre-equalization parameters associated with the pre-equalized signal, and means for transmitting, to the second device, the pre-equalized signal over the channel.

A non-transitory computer-readable medium storing code for wireless communications at a first device is described. The code may include instructions executable by a processor to determine a condition of a channel between the first device and a second device, where the first device is scheduled to transmit a signal to the second device over the channel, apply pre-equalization to the signal based on one or more pre-equalization parameters, the one or more pre-equalization parameters being based on the condition of the channel, transmit, to the second device, a report indicating the one or more pre-equalization parameters associated with the pre-equalized signal, and transmit, to the second device, the pre-equalized signal over the channel.

Some examples of the method, apparatuses, and non-transitory computer-readable medium described herein may further include operations, features, means, or instructions for receiving, from the second device, a configuration message indicating the one or more pre-equalization parameters to include in the report, where the report indicating the one or more pre-equalization parameters may be based on the configuration message.

In some examples of the method, apparatuses, and non-transitory computer-readable medium described herein, transmitting the report indicating the one or more pre-equalization parameters may include operations, features, means, or instructions for transmitting, within the report indicating the one or more pre-equalization parameters, an indication that the pre-equalization may be applied to the signal.

Some examples of the method, apparatuses, and non-transitory computer-readable medium described herein may further include operations, features, means, or instructions for transmitting, to a third device, a second report indicating that the first device applied pre-equalization to the signal over the channel, the second report indicating that the pre-equalization may be based on the channel between the first device and the second device, where the third device may be different from the second device.

Some examples of the method, apparatuses, and non-transitory computer-readable medium described herein may further include operations, features, means, or instructions for determining a power delay profile for signals communicated over the channel, the power delay profile corresponding to the condition of the channel and determining the one or more pre-equalization parameters based on the determined power delay profile, where the one or more pre-equalization parameters include a number of taps of the power delay profile, a value of each tap of the power delay profile, a time-domain location of each tap of the power delay profile, a largest tap of the power delay profile, or a combination thereof.

In some examples of the method, apparatuses, and non-transitory computer-readable medium described herein, the value of each tap include differential values based on a value of the largest tap, and the time-domain location of each tap include differential values based on a time-domain location of the largest tap.

In some examples of the method, apparatuses, and non-transitory computer-readable medium described herein, the value of each tap include differential values based on a value of an adjacent tap, and the time-domain location of each tap include differential values based on a time-domain location of the adjacent tap.

In some examples of the method, apparatuses, and non-transitory computer-readable medium described herein, transmitting the report may include operations, features, means, or instructions for transmitting the report aperiodically or periodically, or any combination thereof, based on a Doppler spread associated with the channel.

Some examples of the method, apparatuses, and non-transitory computer-readable medium described herein may further include operations, features, means, or instructions for identifying one or more additional pre-equalization parameters that may be different from the one or more pre-equalization parameters included in the report and transmitting, to the second device, a second report indicating the identified one or more additional pre-equalization parameters based on the one or more additional pre-equalization parameters being different from the one or more pre-equalization parameters.

Some examples of the method, apparatuses, and non-transitory computer-readable medium described herein may further include operations, features, means, or instructions for determining a level of self-interference at the first device based on the first device operating according to a full-duplex communications mode, applying pre-equalization to the signal based on the determined level of self-interference at the first device, and transmitting, to the second device, a second report indicating a second set of one or more pre-equalization parameters, where the second set of one or more pre-equalization parameters may be based on the level of self-interference at the first device.

A method for wireless communications at a first device is described. The method may include identifying that the first device is scheduled to receive a signal from a second device over a channel between the first device and the second device, receiving, from the second device, a report indicating one or more pre-equalization parameters associated with pre-equalization applied by the second device to the signal, receiving, from the second device, the pre-equalized signal over the channel, and decoding the pre-equalized signal based on the one or more pre-equalization parameters.

An apparatus for wireless communications at a first device is described. The apparatus may include a processor, memory in electronic communication with the processor, and instructions stored in the memory. The instructions may be executable by the processor to cause the apparatus to identify that the first device is scheduled to receive a signal from a second device over a channel between the first device and the second device, receive, from the second device, a report indicating one or more pre-equalization parameters associated with pre-equalization applied by the second device to the signal, receive, from the second device, the pre-equalized signal over the channel, and decode the pre-equalized signal based on the one or more pre-equalization parameters.

Another apparatus for wireless communications at a first device is described. The apparatus may include means for identifying that the first device is scheduled to receive a signal from a second device over a channel between the first device and the second device, means for receiving, from the second device, a report indicating one or more pre-equalization parameters associated with pre-equalization applied by the second device to the signal, means for receiving, from the second device, the pre-equalized signal over the channel, and means for decoding the pre-equalized signal based on the one or more pre-equalization parameters.

A non-transitory computer-readable medium storing code for wireless communications at a first device is described. The code may include instructions executable by a processor to identify that the first device is scheduled to receive a signal from a second device over a channel between the first device and the second device, receive, from the second device, a report indicating one or more pre-equalization parameters associated with pre-equalization applied by the second device to the signal, receive, from the second device, the pre-equalized signal over the channel, and decode the pre-equalized signal based on the one or more pre-equalization parameters.

Some examples of the method, apparatuses, and non-transitory computer-readable medium described herein may further include operations, features, means, or instructions for transmitting, to the second device, a configuration message indicating the one or more pre-equalization parameters to include in the report, where the report indicating the one or more pre-equalization parameters may be based on the configuration message.

In some examples of the method, apparatuses, and non-transitory computer-readable medium described herein, receiving the report indicating the one or more pre-equalization parameters may include operations, features, means, or instructions for receiving, within the report indicating the one or more pre-equalization parameters, an indication that the pre-equalization may be applied to the signal.

In some examples of the method, apparatuses, and non-transitory computer-readable medium described herein, the one or more pre-equalization parameters may be based on a power delay profile for signals communicated over the channel, and the one or more pre-equalization parameters include a number of taps of the power delay profile, a value of each tap of the power delay profile, a time-domain location of each tap of the power delay profile, a largest tap of the power delay profile, or a combination thereof.

In some examples of the method, apparatuses, and non-transitory computer-readable medium described herein, receiving the report may include operations, features, means, or instructions for receiving the report aperiodically or periodically, or any combination thereof, based on a Doppler spread associated with the channel.

Some examples of the method, apparatuses, and non-transitory computer-readable medium described herein may further include operations, features, means, or instructions for receiving, from the second device, a second report indicating a second set of one or more pre-equalization parameters, where the second set of one or more pre-equalization parameters may be based on a level of self-interference at the second device, receiving, from the second device, a second pre-equalized signal over the channel, and applying equalization to the second pre-equalized signal based on the second set of one or more pre-equalization parameters.

A method for wireless communications at a first device is described. The method may include determining a condition of a channel between the first device and a second device, where the first device is scheduled to transmit a signal to the second device over the channel, applying pre-equalization to the signal based on one or more pre-equalization parameters, the one or more pre-equalization parameters being based on the condition of the channel, transmitting, to a third device, a report indicating the one or more pre-equalization parameters associated with the pre-equalized signal, the third device being different from the second device, and transmitting, to the second device, the pre-equalized signal over the channel.

An apparatus for wireless communications at a first device is described. The apparatus may include a processor, memory in electronic communication with the processor, and instructions stored in the memory. The instructions may be executable by the processor to cause the apparatus to determine a condition of a channel between the first device and a second device, where the first device is scheduled to transmit a signal to the second device over the channel, apply pre-equalization to the signal based on one or more pre-equalization parameters, the one or more pre-equalization parameters being based on the condition of the channel, transmit, to a third device, a report indicating the one or more pre-equalization parameters associated with the pre-equalized signal, the third device being different from the second device, and transmit, to the second device, the pre-equalized signal over the channel.

Another apparatus for wireless communications at a first device is described. The apparatus may include means for determining a condition of a channel between the first device and a second device, where the first device is scheduled to transmit a signal to the second device over the channel, means for applying pre-equalization to the signal based on one or more pre-equalization parameters, the one or more pre-equalization parameters being based on the condition of the channel, means for transmitting, to a third device, a report indicating the one or more pre-equalization parameters associated with the pre-equalized signal, the third device being different from the second device, and means for transmitting, to the second device, the pre-equalized signal over the channel.

A non-transitory computer-readable medium storing code for wireless communications at a first device is described. The code may include instructions executable by a processor to determine a condition of a channel between the first device and a second device, where the first device is scheduled to transmit a signal to the second device over the channel, apply pre-equalization to the signal based on one or more pre-equalization parameters, the one or more pre-equalization parameters being based on the condition of the channel, transmit, to a third device, a report indicating the one or more pre-equalization parameters associated with the pre-equalized signal, the third device being different from the second device, and transmit, to the second device, the pre-equalized signal over the channel.

In some examples of the method, apparatuses, and non-transitory computer-readable medium described herein, transmitting the report indicating the one or more pre-equalization parameters may include operations, features, means, or instructions for transmitting, within the report to the third device, an indication that the first device may be transmitting the signal to the second device and an indication that the pre-equalization may be applied to the signal.

Some examples of the method, apparatuses, and non-transitory computer-readable medium described herein may further include operations, features, means, or instructions for receiving, from the third device, a request for the first device to transmit the report indicating the one or more pre-equalization parameters, the request included in a radio resource control message, where transmitting the report to the third device may be based on the request.

Some examples of the method, apparatuses, and non-transitory computer-readable medium described herein may further include operations, features, means, or instructions for transmitting, to the second device, the report indicating the one or more pre-equalization parameters associated with the pre-equalized signal, the report including an indication that the pre-equalization may be applied to the signal.

Some examples of the method, apparatuses, and non-transitory computer-readable medium described herein may further include operations, features, means, or instructions for receiving, from the second device, a request for the first device to transmit the report indicating the one or more pre-equalization parameters, the request included in a radio resource control message, where transmitting the report to the second device may be based on the request.

Some examples of the method, apparatuses, and non-transitory computer-readable medium described herein may further include operations, features, means, or instructions for determining a power delay profile for signals communicated over the channel, the power delay profile corresponding to the condition of the channel and determining the one or more pre-equalization parameters based on the determined power delay profile, where the one or more pre-equalization parameters include a number of taps of the power delay profile, a value of each tap of the power delay profile, a time-domain location of each tap of the power delay profile, a largest tap of the power delay profile, or a combination thereof.

In some examples of the method, apparatuses, and non-transitory computer-readable medium described herein, the value of each tap include differential values based on a value of the largest tap, and the time-domain location of each tap include differential values based on a time-domain location of the largest tap.

In some examples of the method, apparatuses, and non-transitory computer-readable medium described herein, the value of each tap include differential values based on a value of an adjacent tap, and the time-domain location of each tap include differential values based on a time-domain location of the adjacent tap.

In some examples of the method, apparatuses, and non-transitory computer-readable medium described herein, transmitting the report may include operations, features, means, or instructions for transmitting the report aperiodically or periodically, or any combination thereof, based on a Doppler spread associated with the channel.

In some examples of the method, apparatuses, and non-transitory computer-readable medium described herein, a size of the report may be based on a number of taps of a power delay profile of the pre-equalized signal and based on a number of antennas used by the first device to transmit the pre-equalized signal.

A method for wireless communications at a first device is described. The method may include receiving, from a second device, a report indicating a transmission of a pre-equalized signal from the second device to a third device, the report indicating one or more pre-equalization parameters associated with the pre-equalized signal, receiving the pre-equalized signal that is transmitted from the second device to the third device over a channel between the second device and the third device, and performing one or more interference cancellation procedures for interference corresponding to the pre-equalized signal, the one or more interference cancellation procedures based on the report.

An apparatus for wireless communications at a first device is described. The apparatus may include a processor, memory in electronic communication with the processor, and instructions stored in the memory. The instructions may be executable by the processor to cause the apparatus to receive, from a second device, a report indicating a transmission of a pre-equalized signal from the second device to a third device, the report indicating one or more pre-equalization parameters associated with the pre-equalized signal, receive the pre-equalized signal that is transmitted from the second device to the third device over a channel between the second device and the third device, and perform one or more interference cancellation procedures for interference corresponding to the pre-equalized signal, the one or more interference cancellation procedures based on the report.

Another apparatus for wireless communications at a first device is described. The apparatus may include means for receiving, from a second device, a report indicating a transmission of a pre-equalized signal from the second device to a third device, the report indicating one or more pre-equalization parameters associated with the pre-equalized signal, means for receiving the pre-equalized signal that is transmitted from the second device to the third device over a channel between the second device and the third device, and means for performing one or more interference cancellation procedures for interference corresponding to the pre-equalized signal, the one or more interference cancellation procedures based on the report.

A non-transitory computer-readable medium storing code for wireless communications at a first device is described. The code may include instructions executable by a processor to receive, from a second device, a report indicating a transmission of a pre-equalized signal from the second device to a third device, the report indicating one or more pre-equalization parameters associated with the pre-equalized signal, receive the pre-equalized signal that is transmitted from the second device to the third device over a channel between the second device and the third device, and perform one or more interference cancellation procedures for interference corresponding to the pre-equalized signal, the one or more interference cancellation procedures based on the report.

Some examples of the method, apparatuses, and non-transitory computer-readable medium described herein may further include operations, features, means, or instructions for transmitting, to the second device, a request for the second device to transmit the report indicating the one or more pre-equalization parameters, the request included in a radio resource control message, where receiving the report may be based on the request.

In some examples of the method, apparatuses, and non-transitory computer-readable medium described herein, the one or more pre-equalization parameters may be based on a power delay profile for signals communicated over the channel, and the one or more pre-equalization parameters include a number of taps of the power delay profile, a value of each tap of the power delay profile, a time-domain location of each tap of the power delay profile, a largest tap of the power delay profile, or a combination thereof.

In some examples of the method, apparatuses, and non-transitory computer-readable medium described herein, receiving the report may include operations, features, means, or instructions for receiving the report periodically or aperiodically, or any combination thereof, based on a Doppler spread associated with the channel.

DETAILED DESCRIPTION

Figure 1:
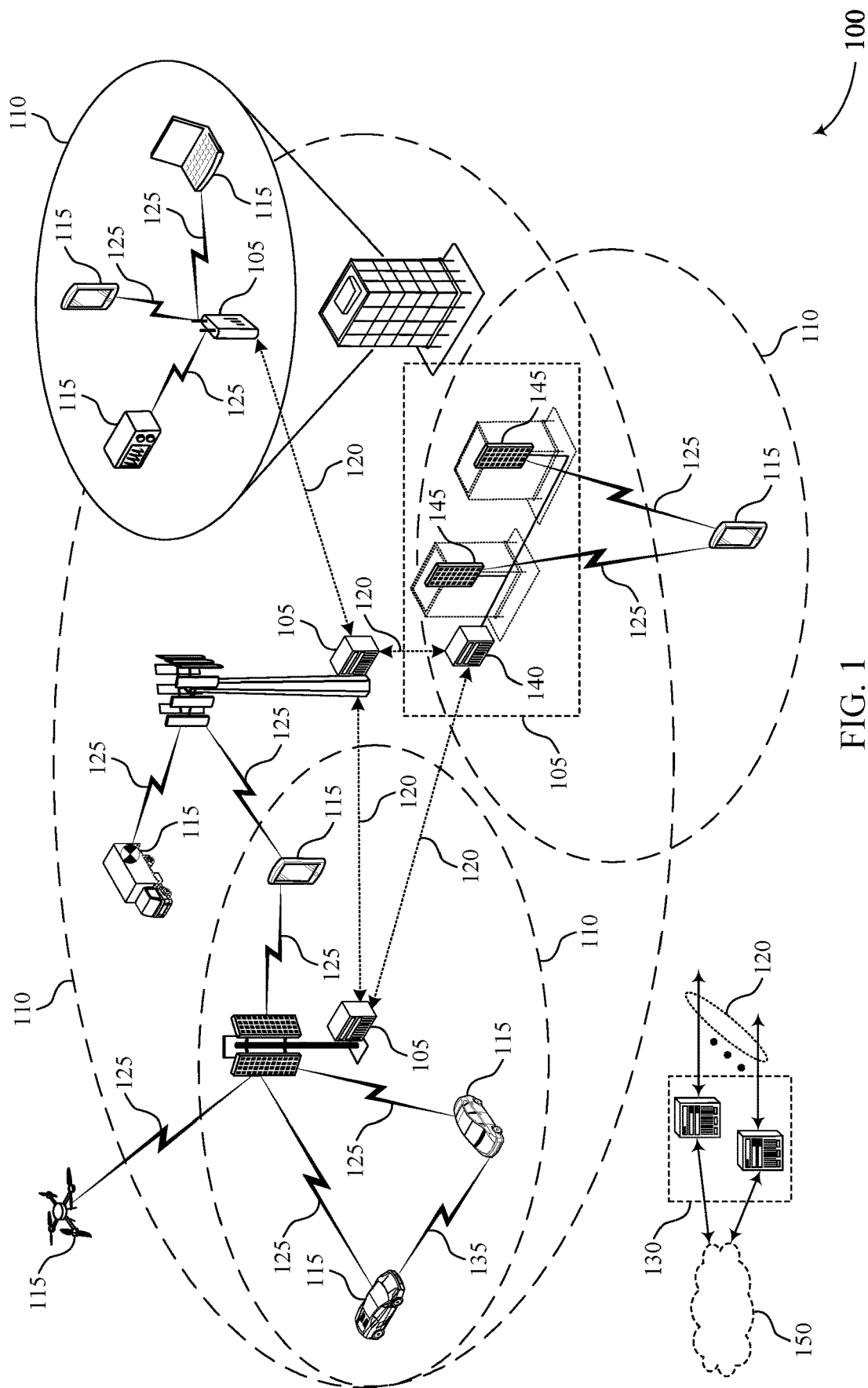
FIG. 1 illustrates an example of a wireless communications system that supports techniques for pre-equalization reporting in accordance with aspects of the present disclosure.

In some wireless communications systems, a first device (e.g., a UE, a base station) may transmit one or more signals to a second device (e.g., UE, base station) via a channel between the first device and the second device. However, in some cases (e.g., a multi-path environment), the environment may impact a signal between transmission and reception of the signal. For example, the channel between the first device and the second device over which the signal is transmitted may change the original signal. As such, the second device may receive a signal that is different from or modified compared to the signal transmitted by the first device. The second device may then perform equalization techniques to deconvolve the received signal of the effects of the channel, which may be a time-consuming, power-consuming procedure.

To mitigate excess power consumption at a device, such as a receiving device (e.g., the second device), the transmitting device (e.g., the first device) may perform pre-equalization on the signal prior to transmission, where the pre-equalization may preemptively account for (e.g., counteract) the channel environment. As such, the second device may receive the pre-equalized signal convolved with the effects of the channel, and the second device may efficiently decode the signal, as the pre-equalization may cancel out the effects of the channel, leaving the second device with the original signal. Pre-equalization may be an efficient method for improving coverage, throughput, and UE power consumption due to the second device being able to efficiently determine the original signal. However, in some cases, a third device different from the second device, may receive the pre-equalized signal. Due to the pre-equalization being based on the channel between the first device and the second device, the pre-equalization may not be effective for the channel between the first device and the third device (e.g., that is different from the channel between the first device and the second device). As such, the third device may perform equalization on the received signal due to the pre-equalization of the signal and may additionally perform equalization on the received signal to account for the effects of the channel between the first device and the third device, resulting in decreased throughput and increased power consumption at the third device.

Further, in some cases, the first device may operate in a full-duplexing mode, such that the first device may simultaneously transmit and receive. However, simultaneous transmission and reception of signals may introduce interference (e.g., self-interference) to the transmitted signal, the received signal, or both. As such, the first device may apply pre-equalization to a signal being transmitted by the first device to the second device that may account for the self-interference. However, such pre-equalization may not account for the channel between first device and the second device and, as such, the second device may perform equalization of the received signal to cancel out the pre-equalization of the signal that accounts for the self-interference and may additionally perform equalization of the received signal to cancel out the effects of the channel between the first device and the second device. Such processes may result in decreased throughput and increased power consumption at the second device.

A receiving device (e.g., the second device or the third device in the above examples) may not be configured with information related to the pre-equalization applied to a signal by a transmitter (e.g., the first device), and/or the receiving device may not easily and/or accurately estimate the applied pre-equalization to a signal. As such, the receiving device (e.g., the third device, or the second device in the full-duplexing scenario) may not be able to efficiently equalize the pre-equalization applied to the signal.

To improve communications using pre-equalization techniques, a device transmitting a signal (e.g., the first device) may be configured to transmit, to one or more other devices (e.g., the second device, the third device), a pre-equalization report. The pre-equalization report may include an indication that pre-equalization was applied to the signal and/or one or more parameters associated with the pre-equalization applied to the signal. The first device may transmit a pre-equalization report for each signal the first device applied pre-equalization to, and/or the first device may transmit the report upon request, such as upon request by the second device or the third device. In some cases, the first device may be configured to transmit the report to one or more potential un-intended receivers of the signal, where the signal may be received as interference, and/or to one or more intended receivers of the signal (e.g., receivers scheduled to receive the signal). The one or more devices that the first device may transmit the report to may be based on a mode of communication of the transmitting device (e.g., half-duplex mode, full-duplex mode), or based on the communications environment (e.g., neighboring receivers to the intended receiver), or both.

As such, a device that receives the pre-equalization report and the pre-equalized signal may use the pre-equalization report to efficiently decode the received signal and/or perform interference cancellation procedures. For example, in a non-full-duplexing scenario, the third device may receive the pre-equalization report and receive the pre-equalized signal that is pre-equalized based on the channel between the first device and the second device. The third device may use the pre-equalization report to cancel out the pre-equalization applied to the signal to decode the original signal and/or to perform an interference cancellation procedure of the original signal. In another example, such as in a full-duplexing scenario, the second device may receive the pre-equalization report, and receive the pre-equalized signal that is pre-equalized based on self-interference at the first device. The second device may use the pre-equalization report to cancel out the pre-equalization applied to the signal to decode the original signal.

Some aspects of the subject matter described herein may be implemented to realize one or more advantages. The described techniques may support improvements in communications via pre-equalized signals by improving reliability and efficiency, mitigating link dispersiveness, and decreasing latency among other advantages. As such, supported techniques may include improved network operations and, in some examples, may promote network efficiencies, among other benefits.

Aspects of the disclosure are initially described in the context of wireless communications systems. Aspects are then described with reference to process flows. Aspects of the disclosure are further illustrated by and described with reference to apparatus diagrams, system diagrams, and flowcharts that relate to techniques for pre-equalization reporting.

FIG. 1 illustrates an example of a wireless communications system 100 that supports techniques for pre-equalization reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

In some wireless communications systems, a first device (e.g., a UE 115, a base station 105) may transmit one or more signals to a second device (e.g., UE 115, base station 105) via a channel between the first device and the second device. However, in some environments (e.g., a multi-path environment), the environment may impact signal between transmission and repletion of the signal. For example, the channel between the first device and the second device, over which the signal is transmitted may change the original signal. As such, the second device may receive a signal that is different from or modified compared to the signal transmitted by the first device. The second device may then perform equalization techniques to deconvolve the received signal of the effects of the channel, which may be a time-consuming, power-consuming procedure. To reduce the power consumption and excess processing at a device, such as a receiving device (e.g., the second device), the transmitting device (e.g., the first device) may perform pre-equalization on the signal prior to transmission that accounts for (e.g., counteracts) the channel environment. As such, the second device may receive the pre-equalized signal convolved with the effects of the channel, and the second device may efficiently decode the signal as the pre-equalization may cancel out the effects of the channel, leaving the second device with the original signal. Pre-equalization may be an efficient method for improving the coverage, throughput, and UE power consumption due to the second device being able to efficiently determine the original signal. However, in some cases, a third device different from the second device, may receive the pre-equalized signal. Due to the pre-equalization being based on the channel between the first device and the second device, the pre-equalization may not cancel out with the channel between the first device and the third device. As such, the third device may perform equalization on the received signal to cancel or remove the pre-equalization of the signal and may additionally perform equalization on the received signal to cancel out the effects of the channel between the first device and the third device, resulting in decreased throughput and increased power consumption at the third device.

Further, in some cases, the first device may operate in a full-duplexing mode, such that the first device may transmit and receive, simultaneously. However, the simultaneous transmission and reception of signals may introduce interference (e.g., self-interference) to the transmitted signal, the received signal, or both. As such, the first device may apply pre-equalization to a signal being transmitted by the first device to the second device that may account for the self-interference. However, such pre-equalization may not account for the channel between first device and the second device and as such, the second device may perform equalization of the received signal to cancel out the pre-equalization of the signal that accounts for self-interference and may additionally perform equalization of the received signal to cancel out the effects of the channel between the first device and the second device, resulting in decreased throughput and increased power consumption at the second device.

A receiving device (e.g., the second device, the third device) may not be configured with information related to the pre-equalization applied to a signal by a transmitter (e.g., the first device), and/or the receiving device may not easily and/or accurately estimate the applied pre-equalization to a signal. As such, the receiving device (e.g., the third device, or the second device in the full-duplexing scenario) may not be able to efficiently equalize the pre-equalization applied to the signal.

To improve communications using pre-equalization techniques, the device transmitting the signal (e.g., the first device, UE 115, or base station 105) may be configured to transmit, to one or more other devices (e.g., the second device, the third device), a pre-equalization report. The report may include an indication that pre-equalization was applied to the signal, and/or one or more parameters associated with the pre-equalization applied to the signal. The first device may transmit a pre-equalization report for each signal the first device applied pre-equalization to, and/or the first device may transmit the report upon request, such as upon request by the second device or the third device. In some cases, the first device may be configured to transmit the report to one or more potential un-intended receivers of the signal, where the signal may be received as interference, and/or to one or more intended receivers of the signal (e.g., receivers scheduled to receive the signal). The one or more devices that the first device may transmit the report to may be based on a mode of communication of the transmitting device (e.g., half-duplex mode, full-duplex mode), or based on the communications environment (e.g., neighboring receivers to the intended receiver), or both.

As such, a device that receives the pre-equalization report and the pre-equalized signal may use the pre-equalization report to efficiently decode the received signal and/or perform interference cancellation procedures. For example, in a non-full-duplexing scenario, the third device may receive the pre-equalization report, and receive the pre-equalized signal that is pre-equalized based on the channel between the first device and the second device. The third device may use the pre-equalization report (e.g., including various parameters used when pre-equalization was applied to a signal) to cancel the pre-equalization applied to the signal to decode the original signal and/or to perform an interference cancellation procedure of the original signal. In another example, such as in a full-duplexing scenario, the second device may receive the pre-equalization report, and receive the pre-equalized signal that is pre-equalized based on self-interference at the first device. The second device may use the pre-equalization report to cancel out the pre-equalization applied to the signal to decode the original signal.

Some aspects of the techniques supported by wireless communications system 100 (e.g., reporting pre-equalization information) may be implemented to realize one or more advantages. The described techniques may support improvements in communications via pre-equalized signals by improving reliability and efficiency, mitigating link dispersiveness, and decreasing latency among other advantages. As such, supported techniques may include improved network operations and, in some examples, may promote network efficiencies, among other benefits.

Figure 2A:
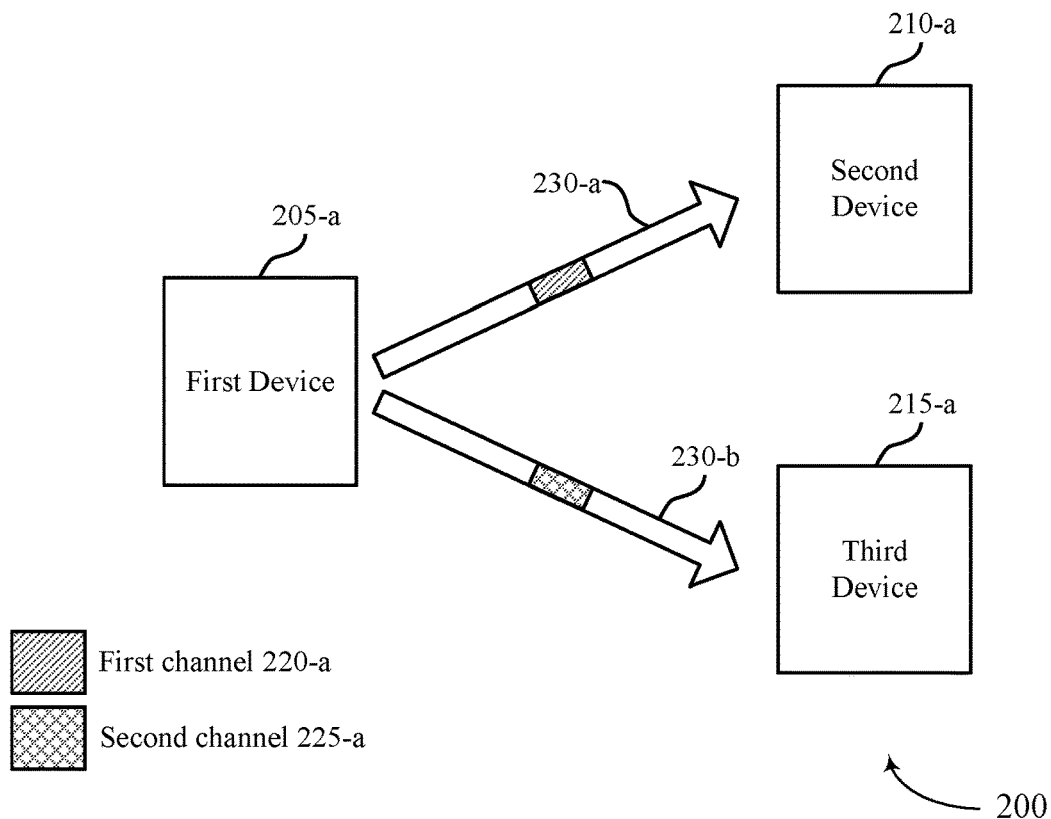
FIG. 2A and FIG. 2B illustrate examples of wireless communications systems that support techniques for pre-equalization reporting in accordance with aspects of the present disclosure.
Figure 2B:
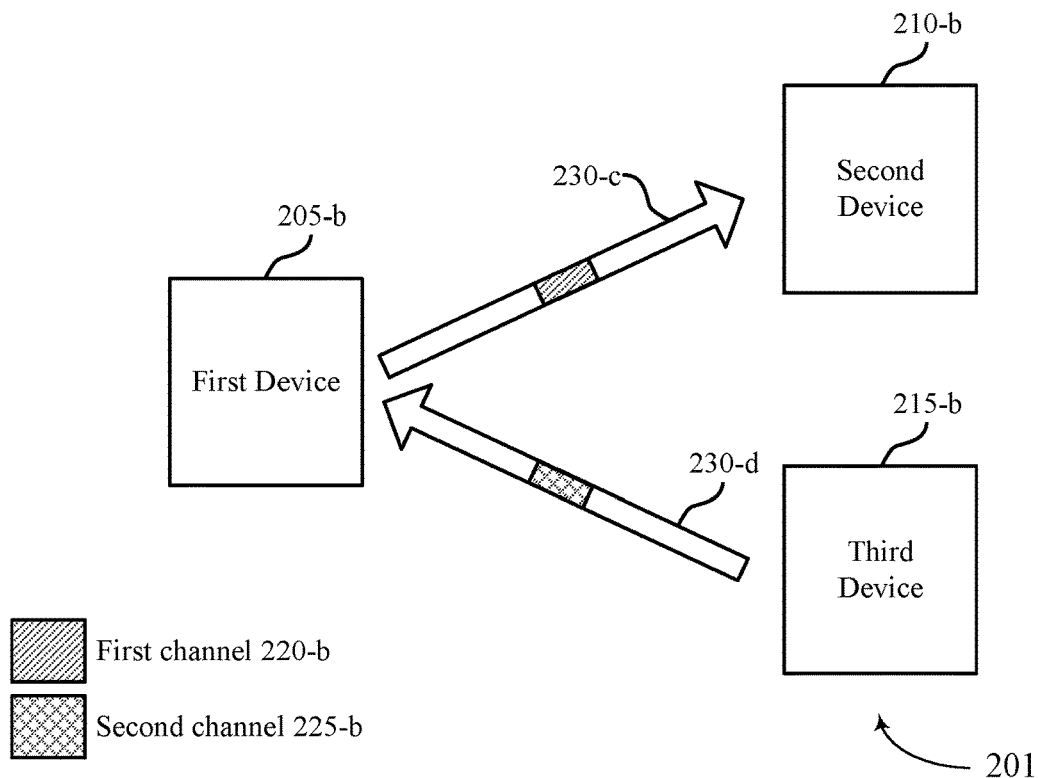

FIG. 2A and FIG. 2B illustrate examples of a wireless communications system 200, and a wireless communications system 201, respectively, that support techniques for pre-equalization reporting in accordance with aspects of the present disclosure. Wireless communications system 200 may include a first device 205-a, a second device 210-a, and a third device 215-a, which may each be examples of a base station, or a UE as described with reference to FIG. 1. Wireless communications system 201 may include a first device 205-b, a second device 210-b, and a third device 215-b, which may each be examples of a base station, or a UE as described with reference to FIG. 1. In some cases, the first device 205-a and the first device 205-b may implement a pre-equalization reporting procedure to one or more other devices. Additionally or alternatively, other wireless devices, such as second device 210-a, second device 210-b, third device 215-a, or third device 215-b, or some combination of these devices, may implement a pre-equalization reporting procedure.

With reference to FIG. 2A, first device 205-a may be an example of a UE, or base station, that may communicate with one or more other devices, such as second device 210-a and third device 215-a, where second device 210-a may be an example of a UE, or base station, and third device 215-a may be an example of a UE, or base station. In some cases, first device 205-a may schedule or be scheduled to transmit a signal to at least second device 210-a. As such, first device 205-a may transmit the signal to second device 210-a via a channel between first device 205-a and second device 210-b. In some cases, first device 205-a may transmit the signal and rely on second device 210-a to resolve the signal of anything added to the signal from the channel between first device 205-a and second device 210-a. For example, in some environments, a transmitted signal may reach a receiving device, such as second device 210-a, via multiple paths due to multi-path propagation, where a transmitted signal may encounter reflective surfaces (e.g., buildings, water, vehicles, mountains) during transmission.

Multipath propagation may refer to a signal that takes two or more paths from a transmitting device to a receiving device. One of the paths may be direct path from the transmitting device to the receiving device such that the signal does not reflect off any surfaces prior to reaching the receiving device, and as such, the direct path may result in the strongest signal and the signal that arrives first at the receiver. In some cases, a path of the signal may incur one or more reflections prior to reaching the receiving devices. Each reflection that a signal incurs on path may result in more time that a signal travels on a path and result in a weaker signal. Signals that travel via non-direct paths (e.g., paths with one or more reflections) may thus be weaker in strength and arrive after a signal that travels via a direct path. As such, the receiving device may receive the transmitted signal as one or more signals dispersed in time and varying in strengths. A power delay profile (PDP) may chart the intensity (e.g., strength, power) of a signal received through a multipath channel as a function of time delay, where the time delay is the difference in travel time between multipath arrivals. As such, a discrete PDP may represent each path the signal traveled, where each path on the PDP may be referred to as a tap. A tap on the PDP may correspond to the received power and the time (e.g., relative time, actual time) at which the receiving device received a signal. The PDP may include any number of taps. In some examples, the strongest and first tap on the PDP may be the signal that traveled the direct path. Each tap, such as taps representing signals that incurred one or more reflections, following the direct-path tap, may be weaker and arrived later than direct-path tap. A delay spread may refer to the difference (e.g., the spread) between the time of arrival of the earliest tap (e.g., the line-of-sight signal, direct signal) and the time of arrival of the last received tap associated with the originally transmitted signal.

In such multipath environments, a receiving device, such as second device 210-a, may receive the transmitted signal as the transmitted signal convolved with the channel (e.g., the signal may be represented as a mathematical convolution of a function representing the channel and a function representing the signal). For example, first device 205-a may transmit a signal, S, to second device 210-a via a channel (e.g., a first channel 220-a), H, between first device 205-a and second device 210-a. Second device 210-a may receive the signal that is convolved with the channel (e.g., represented as S*H). As such, to determine the original, transmitted signal the receiving device may perform equalization techniques to deconvolve the transmitted signal from the effects of the channel. However, such pre-equalization techniques may be time and power consuming at the receiving device.

To mitigate the power consumption at a receiving device (e.g., second device 210-a), the transmitting device (e.g., first device 205-a) may perform pre-equalization on the signal prior to transmission that accounts for (e.g., counteracts) the channel environment. Pre-equalization may also improve coverage and throughput in some communications systems, such as LTE communication systems, NR communications systems, sub-THz communications systems, or the like. Such pre-equalization techniques may include the transmitting device applying channel inversion coefficients, applying power scaling, and so forth, to the signal based on information about the channel and/or the PDP of the channel between the transmitting device and the receiving device. For example, the transmitting device and the receiving device may perform one or more channel estimation procedures to determine one or more parameters of the channel, such as the PDP associated with the channel. Such channel estimation procedures may include the transmitting device transmitting one or more reference signals to the receiving device, where the receiving device may measure the one or more reference signals and transmit information about the one or more measurements to the transmitting device. Additionally or alternatively, a channel estimation procedure may include the receiving device transmitting one or more reference signals to the transmitting device, where the transmitting device may measure the one or more reference signals to determine one or more parameters of the channel. As such, the transmitting device may perform pre-equalization on the signal that accounts for any effects the channel may have on the signal prior to reaching the receiving device based on a channel estimation procedure, such that the pre-equalization may deconvolve the PDP of the channel (e.g., for a given point-to-point channel). For example, first device 205-a may pre-equalize the signal, S, based on the one or more parameters of the channel, H, such as the PDP, and transmit the pre-equalized signal (e.g., $S*H^{-1}$) via communications link 230-a (e.g., an uplink communications link, a downlink communications link, a sidelink communications link). The channel may still affect the transmitted signal, however, if first device 205-a applied pre-equalization to the signal, second device 210-a may efficiently decode the original signal, as the pre-equalization and the effects of the channel may cancel out (e.g., $S*H^{-1}*H$).

Pre-equalization may be an efficient method for improving the coverage, throughput, and UE power consumption due to the receiving device being able to efficiently determine and decode the original signal, without itself performing equalization techniques (e.g., when pre-equalization is not applied). However, accurate channel estimation and tracking may be needed to apply pre-equalization to the signal for the pre-equalization to effectively deconvolve the PDP of the channel. Further, in some cases, another device, such as third device 215-a different from second device 210-a, may receive the pre-equalized signal, such as via communications link 230-b (e.g., an uplink communications link, a downlink communications link, sidelink communications link). Third device 215-a may be a neighboring device to first device 205-a and/or to second device 210-a. In some cases, third device 215-a may receive the pre-equalized signal (e.g., $S*H^{-1}$) from first device 205-a. For example, third device 215-a may receive the pre-equalized signal as interference. However, the environment between first device 205-a and second device 210-a may be different from the environment between first device 205-a and third device 215-a. As such, the channel (e.g., the first channel 220-a), H, between first device 205-a and second device 210-a may be different from the channel (e.g., a second channel 225-a), G, between first device 205-a and the third device 215-a, and thus the PDP of the first channel and the PDP of the second channel may be different. Therefore, if third device 215-a receives the pre-equalized signal, the pre-equalized signal may be convolved with the second channel 225-a (e.g., $S*H^{-1}*G$).

In some cases, third device 215-a may perform cancellation or equalization, such as successive interference cancellation (SIC), of the pre-equalized signal for cancelling the interference. However, such cancelation or equalization procedures may be further complicated when third device 215-a receives a pre-equalized signal that has been pre-equalized based on a channel between the transmitter of the signal and a device different from third device 215-a. For example, third device 215-a may perform equalization of the received pre-equalized signal to cancel out the pre-equalization of the signal and may additionally perform equalization of the received pre-equalized signal to cancel out the effects of the second channel 225-a between first device 205-a and third device 215-a (e.g., $S*H^{-1}*G*H*G^{-1}$), resulting in decreased throughput and increased power consumption at third device 215-a.

To equalize the pre-equalized signal and to at least deconvolve the pre-equalized signal of the effects of the second channel 225-a, third device 215-a may use information of the second channel 225-a. In some cases, information about a channel between a transmitting device and a receiving device may be known to the transmitting device and not the receiving device. As such, the receiving device may estimate the information about the channel (e.g., the channel response, PDP). However, in this case, as the pre-equalized signal may be received over the second channel 225-a for which the pre-equalization may not be related to, third device 215-a may receive the pre-equalized signal as interference with a relatively large delay spread, such as a delay spread beyond the cyclic prefix (CP) which may result in inter-symbol interference (ISI). ISI may refer to distortion of signal in which one symbol interferes with subsequent symbols. Such ISI may occur, because the delay spread of the signal may be larger than the allotted time given by the CP, thereby impacting subsequent signals in subsequent symbols. When the delay spread of the received signal is beyond the CP, thus resulting in ISI, third device 215-a may be unable to estimate information associated with the second channel 225-a (e.g., the channel response, PDP). As the pre-equalization channel response may not be corrected (e.g., equalized) without accurate channel information, third device 215-a may be unable to cancel the interference.

With reference to FIG. 2B, first device 205-*b* may be an example of a UE, or base station, that may communicate with one or more other devices, such as second device 210-*b* and third device 215-*b*, where second device 210-*b* may be an example of a UE, or base station, and third device 215-*b* may be an example of a UE, or base station. In some cases, first device 205-*b* may schedule or be scheduled to transmit a signal to at least second device 210-*b*. As such, first device 205-*b* may transmit the signal to second device 210-*b* on a channel, such as a first channel 220-*b*, between first device 205-*b* and second device 210-*b* via communications link 230-*c* (e.g., an uplink communications link, a downlink communications link, sidelink communications link).

In some implementations, first device 205-*b* may operate in a full-duplexing mode such that first device 205-*b* may transmit and receive one or more signals simultaneously. In such a mode, first device 205-*b* may receive a signal such as a signal from third device 215-*b* at the same time first device 205-*b* may transmit a signal to second device 210-*b*. First device 205-*b* may receive the signal from third device 215-*b* on a second channel 225-*b* via a communications link 230-*d* (e.g., an uplink communications link, a downlink communications link, sidelink communications link). Such simultaneous communications may cause self-interference, $H_{self}$, at the full-duplexing device (e.g., first device 205-*b*). In some cases, first device 205-*b* may apply pre-equalization, $H_{self}^{-1}$, to a transmitted signal, S, such as the signal transmitted to second device 210-*b*, that cancels out any self-interference that may be introduced into a signal received by first device 205-*b* caused by the simultaneous transmission of a signal to second device 210-*b*. The pre-equalization may not account for the first channel 220-*b*, H, between first device 205-*b* and second device 210-*b*. For example, first device 205-*b* may transmit a pre-equalized signal (e.g., $S*H_{self}^{-1}$) to second device 210-*b*. Second device 210-*b* may receive the pre-equalized signal convolved with the first channel 220-*b* (e.g., $S*H_{self}^{-1}$). Due to such self-interference pre-equalization techniques, first device 205-*b* may more efficiently receive a signal, T, from third device 215-*b* via a second channel 225-*b*, G, where third device 215-*b* may transmit a non-pre-equalized signal. First device 205-*b* may thus receive the signal, T, convolved with the channel, G (e.g., T*G). First device 205-*b* may receive the signal from third device 215-*b*, but the signal transmitting by first device 205-*b* to second device 210-*b* may impact the reception of the signal. However, because pre-equalization applied to the signal, S, accounts for the self-interference, first device 205-*b* may efficiently cancel out the interference to receive the signal, T, convolved with the second channel 225-*b*, G (e.g., first device 205-*b* may receive (($S*H_{self}^{-1}*H_{self}$)(T*G)), resulting in S+(T*G)), where first device 205-*b* may perform a cancelation procedure to gain T*G). First device 205-*b* may perform equalization to obtain and decode the originally transmitted signal, T. Further, because the pre-equalization accounts for self-interference at first device 205-*b*, the pre-equalization may cause second device 210-*b* to receive the pre-equalized signal with a large delay spread, thus causing link dispersiveness and, in some cases, degradation to the first channel 220-*b*, as second device 210-*b* may be unable to, or inefficiently able to deconvolve the received signal.

In some implementations (not depicted), a transmitting device may apply cyclic delay diversity (CDD) to transform spatial diversity into frequency diversity so as to avoid ISI. For example, if a transmitting device transmitted a signal via multiple antennas simultaneously, some of the signals transmitted via different antennas may interfere with one another. As such, a transmitting device may transmit a signal via multiple antennas, but the transmitting device may introduce some delay to each antenna transmission of the signal. For example, the transmitting device may transmit the signal via a first antenna, and after a duration, may transmit the signal via a second antenna, and so on. In some cases, CDD may be referred to as an additional channel, J, with a PDP and delay spread, where the number of taps of the CDD channel may be equal to the number of antennas. As such, a transmitting device (e.g., first device 205-*a*, first device 205-*b*) may apply CDD to a signal, S (e.g., S*J), and transmit the signal to a receiving device via a channel, H, between the transmitting device and the receiving device. A receiving device may receive the CDD signal convolved with the channel, H, (e.g., S*J*H). As such, the receiving device may perform equalization techniques to deconvolve the signal off the CDD applied to the signal and perform equalization techniques to deconvolve the signal off the channel, H. However, as the receiving device may not have information regarding the channel, and/or the CDD, the receiving device may perform estimation techniques which may be inefficient and/or inaccurate, and in some cases, the receiving device may be unable to estimate the CDD and/or the channel.

To improve the efficiency and reliability of communications between a first device (e.g., first device 205-*a*, first device 205-*b*) and one or more other devices (e.g., second device 210-*a*, second device 210-*b*, third device 215-*a*, third device 215-*b*), the first device (e.g., first device 205-*a*, first device 205-*b*) may be configured to transmit a report to the one or more other devices, where the report may include one or more parameters associated with a pre-equalization applied to a signal transmitted by the first device. The one or more parameters included in the report may indicate that pre-equalization is applied to one or more subsequent signals, and/or indicate the channel response (e.g., the PDP) applied to the one or more subsequent signals. Based on the received report, a receiver of the pre-equalized signal may efficiently deconvolve the applied pre-equalization to reduce ISI and improve network performance. In some cases, the first device (e.g., first device 205-*a*, first device 205-*b*) may transmit the report to an intended receiver of the signal, and/or to a potential unintended receiver of the signal, such as a device that may receive the signal as interference. In some cases, the first device may transmit the report to another device upon request by the other device. In some cases, the first device may transmit the report for each signal the first device transmits, or the first device may transmit the report when the channel has changed such that the previous report transmitted is no longer accurate.

In some implementations, a base station may configure the parameters included in the pre-equalization report. For example, at connection establishment between a UE and base station, the base station may configure the one or more pre-equalization parameters to be included in each pre-equalization report. In some cases, the base station may configure one or more configurations for pre-equalization reports, where each configuration may include a different set of one or more pre-equalization parameters. The one or more pre-equalization parameters may include an indication that pre-equalization is applied to one or more subsequent signals, a number of taps of the PDP applied to the signal, a value of each tap of the PDP, a time-domain location of each tap of the PDP, a largest tap of the PDP, or a combination thereof. For example, the base station may configure the number of taps (e.g., K taps) to be included in a pre-equalization report, and/or may configure the quantization levels of the tap values and delays. In some cases, the base station may configure the tap values and delays to be included in the pre-equalization report as actual values, or as relative values, etc. The pre-equalization report may include the relatively strongest (e.g., highest, largest) tap value to the relatively weakest (e.g., lowest, smallest) tap value. In some cases, the strongest tap value may be excluded from the pre-equalization report, where the remaining tap values included in the pre-equalization report may be reported relative to the largest tap value, or relative to an adjacent tap value, such that the reported value of each tap may be a difference between two tap values. For example, relative values may refer to a value of each tap that may be a differential value based on a value of the largest tap, and the time-domain location of each tap may be a differential value based on a time-domain location of the largest tap. In some cases, relative values may refer to a value of each tap that may be a differential value based on a value of an adjacent tap, and the time-domain location of each tap may be a differential value based on a time-domain location of a previous, adjacent tap. In some cases, the dimension of the report may be equal to K taps or K–1 taps multiplied by the number of antennas used for the pre-equalization. If the dimension of the report is K–1 taps, the report may not include the strongest tap.

In some cases, the transmitter of a pre-equalized signal may be a UE, and the UE may determine to transmit a pre-equalization report to a base station (e.g., a serving base station of the UE, neighboring base station). The base station may or may not be the intended receiver of the pre-equalized signal. In such cases, the UE may include in the report an indication that the UE may apply pre-equalization to one or more subsequent transmissions. For example, the UE may indicate a number of subsequent pre-equalized transmissions for which the pre-equalization report applies. In some cases, the UE may identify specific pre-equalized transmissions for which the pre-equalization report applies. In some implementations, the UE may include in the pre-equalization report an indication of whether the pre-equalization is intended for pre-equalizing a signal based on a channel between the UE and the base station, based on a different channel, such as a channel between the UE and another device (e.g., another UE, another base station), or based on CDD. If the pre-equalization is based on a channel between the UE and another device, the UE may identify the other device in the pre-equalization report to the base station.

The UE may include in the pre-equalization report, the K tap values and delays of the applied channel response to the pre-equalized signal (as configured by the base station). The UE may transmit the pre-equalization report aperiodically, semi-persistently, or dynamically. In some examples, the pre-equalization report may be transmitted via a radio resource control (RRC) message, a medium access control (MAC) control element (MAC-CE) message, an uplink control information (UCI) message, or the like. For example, due to the dependency that pre-equalization has on the condition of the channel, the UE may transmit the report including one or more parameters, such as each tap value of the K tap values (e.g., real numbers, complex numbers) and each delay, in a periodic or aperiodic manner based on the doppler spread associated with the channel. In some cases, the UE may transmit the pre-equalization report in a shared channel, such as a physical uplink shared channel (PUSCH). In some cases, the UE be configured to transmit the report based on a trigger. For example, the UE may transmit (e.g., trigger) a report if one or more pre-equalization parameters (e.g., the channel response) applied to a current signal are different from the one or more pre-equalization parameters included in a previous pre-equalization report, such that the previous report no longer applies.

The UE may transmit the pre-equalization report to the base station as described herein, and the base station may use the pre-equalization report to perform an accurate analog and/or digital equalization of a received pre-equalized signal from the UE to improve the link performance between the base station and UE. If the base station applied analog equalization, the base station may achieve full cancellation of the pre-equalization which may reduce the channel dispersiveness and improve network performance.

In some cases, the transmitter of a pre-equalized signal may be a base station. In some cases, when the base station determines to perform pre-equalization on a signal to a device (e.g., a UE, or other base station), the base station may transmit a pre-equalization report to one or more other devices (e.g., other UEs, other base stations), where the pre-equalization report may indicate that the one or more other devices may receive a pre-equalized signal as interference, that is intended for a device other than the one or more other devices. In some cases, the base station may include in the report an indication of a number of pre-equalized signals, or an indication of specific pre-equalized signals that the one or more other devices may receive as interference. In some implementations, the base station may include in the report, one or more pre-equalization parameters associated with the pre-equalization applied to the signal, such as the K tap values (of K–1 tap values) and delays of the applied channel response to the pre-equalized signal. The base station may transmit the one or more pre-equalization parameters upon request. For example, the base station may (only) transmit the pre-equalization report and/or include an indication of the one or more pre-equalization parameters (e.g., K tap values and delays) in a pre-equalization report to a device if the base station received a request from the device to do so. In some cases, a request from a device may include a request for a preconfigured report, or the request may include a request for specific information, such as specific pre-equalization parameters. As such, the information that the base station may include in the report may be dynamic. In some cases, the one or more other devices may determine to perform analog and/or digital equalization according on the reported one or more parameters (e.g., K tap values and delays). Such users may estimate the remaining interference channel response for a SIC (e.g., for a SIC algorithm).

The base station may transmit the pre-equalization report aperiodically, semi-persistently, or dynamically, such as via an RRC message, a MAC-CE message, or a downlink control information (DCI) message. For example, due to the dependency that pre-equalization has on the condition of the channel, the base station may transmit the report including each tap value of the K tap values (e.g., real numbers, complex numbers) and each delay in a periodic or aperiodic manner based on the doppler spread associated with the channel. In some cases, the base station may be configured to transmit the report based on a trigger. For example, the base station may transmit (e.g., trigger) a report if one or more pre-equalization parameters (e.g., the channel response) applied to a current signal are different from the one or more pre-equalization parameters included in a previous pre-equalization report, such that the previous report no longer applies.

For example, with reference to FIG. 2A, first device 205-*a* may apply pre-equalization to a signal that accounts for the first channel 220-*a*, and transmit the signal to second device 210-*b*, where third device 215-*a* may receive the pre-equalized signal as interference. In some cases, prior to the signal being transmitted, second device 210-*a* and/or third device 215-*a* may request that first device 205-*a* transmit a pre-equalization report to second device 210-*a* and third device 215-*a*, respectively, for each signal transmitted by first device 205-*a*, or a specific signal transmitted by first device 205-*a*. First device 205-*a* may transmit the pre-equalization report to second device 210-*a* and/or third device 215-*a*, based on the requests by second device 210-*a* and third device 215-*a*, respectively, or first device 205-*a* may otherwise determine to transmit the pre-equalization report to second device 210-*a* and/or third device 215-*a*. If second device 210-*a* (e.g., the intended receiver of the pre-equalized signal) receives the pre-equalization report, and the pre-equalized signal, the second device 210-*a* may use the pre-equalization report in the case that one or more errors occur. If third device 215-*a* (e.g., the un-intended receiver of the pre-equalized signal) receives the pre-equalization report, and the pre-equalized signal, the third device 215-*a* may use the pre-equalization report to deconvolve the pre-equalized signal of the pre-equalization to perform one or more interference cancellation procedures.

In another example, with reference to FIG. 2B, first device 205-*b* may apply pre-equalization to a signal to be transmitted to second device 210-*b* that account for self-interference at first device 205-*b* caused by a simultaneous reception of another signal from third device 215-*b*. In some cases, prior to the signal being transmitted, second device 210-*b* may request that first device 205-*b* transmit a pre-equalization report to second device 210-*b*, for each signal transmitted by first device 205-*b*, or a specific signal transmitted by first device 205-*b*. First device 205-*b* may transmit the pre-equalization report to second device 210-*b*, based on the request by second device 210-*b*, or first device 205-*b* may otherwise determine to transmit the pre-equalization report to second device 210-*b*. If second device 210-*b* receives the pre-equalization report, and the pre-equalized signal, the second device 210-*b* may use the pre-equalization report to deconvolve the pre-equalized signal of the pre-equalization (e.g., self-interference pre-equalization) to decode the original, non-pre-equalized signal.

In another example, such as in the case that a transmitting device applies CDD to a transmitted signal, prior to the transmission of the signal, a receiving device (e.g., the intended receiver of the signal), may transmit a request to the transmitting device that requests the transmitting device to transmit a pre-equalization report (e.g., a CDD report) that includes one or more parameters associated with the CDD being applied to the signal. The transmitting device may transmit a pre-equalization report to the receiving device based on the request, or the transmitting device may otherwise determine to transmit the pre-equalization report to the receiving device. If the receiving device receives the pre-equalization report, followed by the CDD signal, the receiving device may use the pre-equalization report to deconvolve the CDD signal of the CDD applied to the signal. The examples described herein may occur in any combination with one another.

Figure 3:
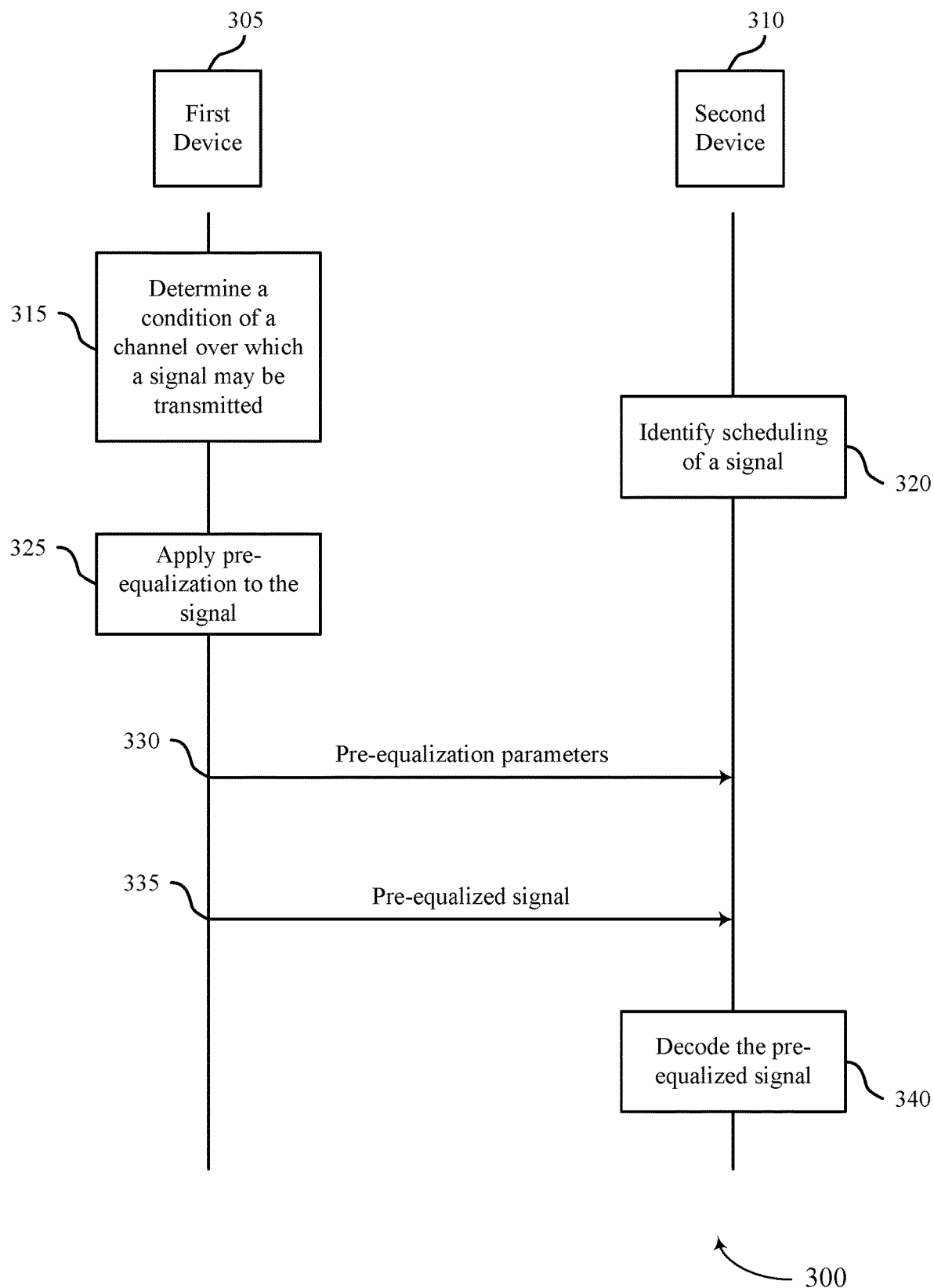
FIG. 3 illustrates an example of a process flow in a system that supports techniques for pre-equalization reporting in accordance with aspects of the present disclosure.

FIG. 3 illustrates an example of a process flow 300 in a system that supports techniques for pre-equalization reporting in accordance with aspects of the present disclosure. The process flow 300 may illustrate an example pre-equalization reporting procedure. For example, a first device 305 may perform a pre-equalization reporting procedure with at least a second device 310. First device 305 and second device 310 may be examples of corresponding first devices and second devices as described with reference to FIGS. 2A and 2B. First device 305 may be an example of a UE or a base station and second device 310 may be an example of a UE or a base station as described with reference to FIGS. 1, 2A, and 2B. Alternative examples of the following may be implemented, where some steps are performed in a different order than described or are not performed at all. In some cases, steps may include additional features not mentioned below, or further steps may be added.

At 315, the first device 305 may determine a condition of a channel between the first device 305 and a second device 310, where the first device 305 may be scheduled to transmit a signal to the second device 310 over the channel. In some cases, the first device 305 may determine a PDP for signals communicated over the channel, where the PDP may correspond to the condition of the channel. The first device 305 may determine the one or more pre-equalization parameters based on the determined PDP, where the one or more pre-equalization parameters may include a number of taps of the PDP, a value of each tap of the PDP, a time-domain location of each tap of the PDP, a largest tap of the PDP, or a combination thereof. In some cases, the value of each tap may include differential values based on a value of the largest tap, and the time-domain location of each tap may include differential values based on a time-domain location of the largest tap. In some cases, the value of each tap may include differential values based on a value of an adjacent tap, and the time-domain location of each tap may include differential values based on a time-domain location of the adjacent tap.

At 320, the second device 310 may identify that the second device 310 is scheduled to receive a signal from the first device 305 over a channel between the first device 305 and the second device 310.

At 325, the first device 305 may apply pre-equalization to the signal based on one or more pre-equalization parameters. The one or more pre-equalization parameters may be based on the condition of the channel.

At 330, the first device 305 may transmit, to the second device 310, a report indicating the one or more pre-equalization parameters associated with the pre-equalized signal. In some implementations, first device 305 may receive, from the second device 310, a configuration message indicating one or more pre-equalization parameters to include in the report. As such, the report indicating the one or more pre-equalization parameters may be based on the received configuration message. The first device 305 may transmit, within the report indicating the one or more pre-equalization parameters, an indication that the pre-equalization is applied to the signal. The first device 305 may transmit the report aperiodically or periodically, or any combination thereof, for example, based on a Doppler spread associated with the channel.

In some cases, the first device 305 may transmit, to a third device (e.g., a base station, a UE), a second report indicating that the first device 305 applied pre-equalization to the signal over the channel, where the second report may indicate that the pre-equalization is based on the channel between the first device 305 and the second device 310. The third device may be different from the second device 310.

In some cases, the first device 305 may determine a level of self-interference at the first device 305 based on the first device operating according to a full-duplex communications mode. The first device 305 may apply pre-equalization to a signal based on the determined level of self-interference at the first device, and transmit, to the second device 310, a second report indicating a second set of one or more pre-equalization parameters. The second set of one or more pre-equalization parameters may be based on the level of self-interference at the first device 305.

At 335, the first device 305 may transmit, to the second device 310, the pre-equalized signal over the channel.

At 340, the second device 310 may decode the pre-equalized signal based on the one or more pre-equalization parameters.

In some cases, the first device 305 may identify one or more additional pre-equalization parameters that are different from the one or more pre-equalization parameters included in the report, and transmit, to the second device 310, a second report indicating the identified one or more additional pre-equalization parameters (e.g., updated parameters) based on the one or more additional pre-equalization parameters being different from the one or more pre-equalization parameters. The first device 305 may transmit, to the second device 310, a second pre-equalized signal based on the one or more additional pre-equalization parameters.

Figure 4:
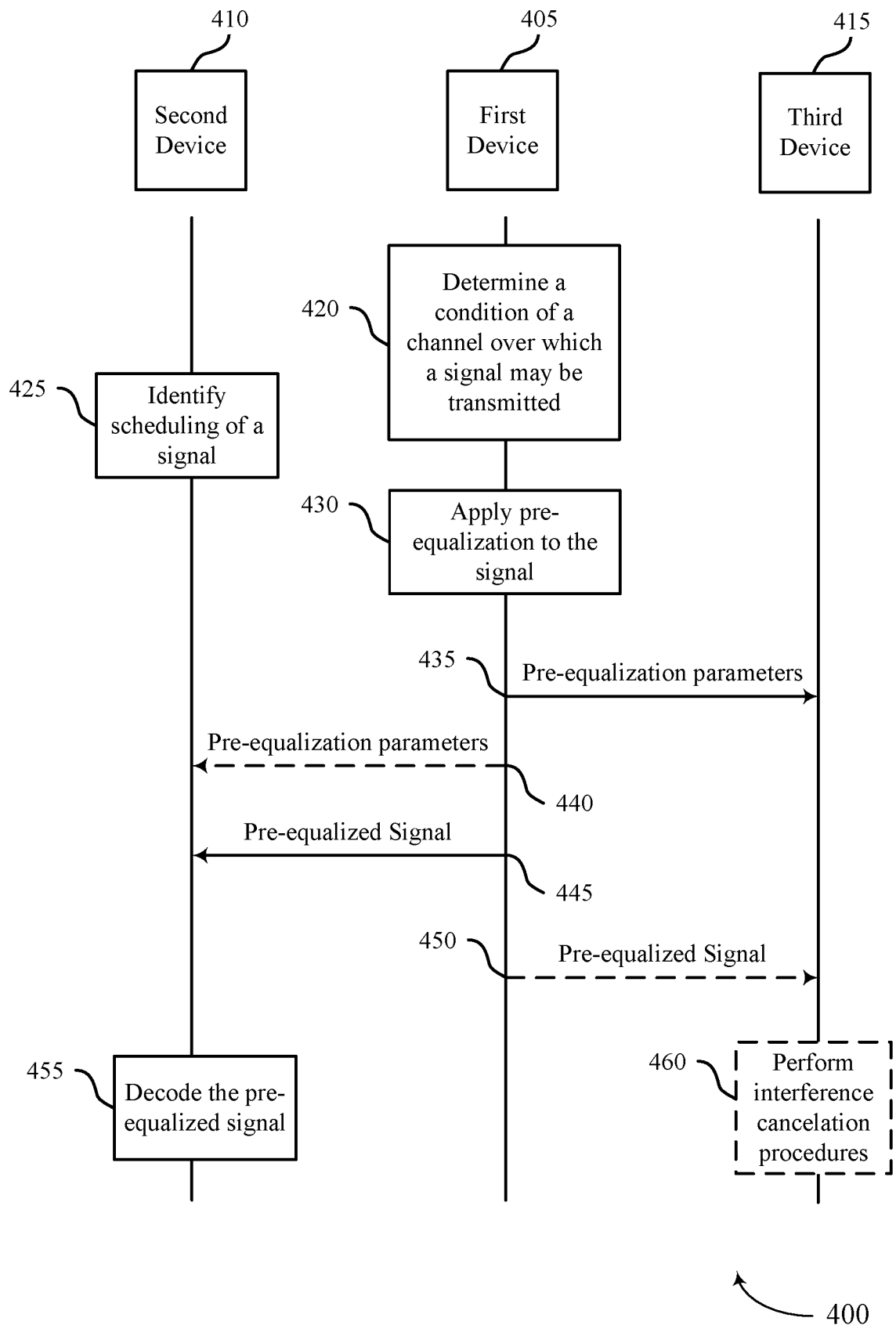
FIG. 4 illustrates an example of a process flow in a system that supports techniques for pre-equalization reporting in accordance with aspects of the present disclosure.

FIG. 4 illustrates an example of a process flow 400 in a system that supports techniques for pre-equalization reporting in accordance with aspects of the present disclosure. The process flow 400 may illustrate an example pre-equalization reporting procedure. For example, a first device 405 may perform a pre-equalization reporting procedure with at least a second device 410 and/or a third device 415. First device 405, second device 410, and third device 415 may be an example of corresponding first devices, second devices, and third devices as described with reference to FIGS. 2A and 2B. First device 405 may be an example of a UE or a base station, second device 410 may be an example of a UE or a base station, and third device 415 may be an example of a UE or a base station as described with reference to FIGS. 1, 2A and 2B. Alternative examples of the following may be implemented, where some steps are performed in a different order than described or are not performed at all. In some cases, steps may include additional features not mentioned below, or further steps may be added.

At 420, the first device 405 may determine a condition of a channel between the first device 405 and a second device 410, wherein the first device 405 may be scheduled to transmit a signal to the second device 410 over the channel.

At 425, the second device 410 may identify that the second device 310 is scheduled to receive a signal from the first device 305 over a channel between the first device 305 and the second device 310.

In some cases, the first device 405 may determine a PDP for signals communicated over the channel, where the PDP may correspond to the condition of the channel. The first device 405 may determine one or more pre-equalization parameters based on the determined PDP, where the one or more pre-equalization parameters may include a number of taps of the PDP, a value of each tap of the PDP, a time-domain location of each tap of the PDP, a largest tap of the PDP, or a combination thereof. The value of each tap may include a differential value based on a value of the largest tap, and the time-domain location of each tap may include a differential value based on a time-domain location of the largest tap. The value of each tap may include a differential value based on a value of an adjacent tap, and the time-domain location of each tap may include differential values based on a time-domain location of the adjacent tap.

At 430, the first device 405 may apply pre-equalization to the signal based on one or more pre-equalization parameters. The one or more pre-equalization parameters may be based on the condition of the channel.

At 435, the first device 405 may transmit, to a third device 415, a report indicating the one or more pre-equalization parameters associated with the pre-equalized signal, where the third device 415 may be different from the second device 410. In some cases, the first device 405 may transmit, within the report to the third device 415, an indication that the first device 405 is transmitting the signal to the second device 410 and an indication that the pre-equalization is applied to the signal. In some cases, the first device 405 may receive, from the third device 415, a request for the first device 405 to transmit the report indicating the one or more pre-equalization parameters. The request may be included in a RRC message, where transmitting the report to the third device 415 may be based on the request. The first device 405 may transmit the report aperiodically or periodically, or any combination thereof, based on a Doppler spread associated with the channel. The size of the report may be based on a number of taps of a PDP of the pre-equalized signal and based on a number of antennas used by the first device to transmit the pre-equalized signal.

In some cases, at 440, the first device 405 may transmit, to the second device 410, a report indicating the one or more pre-equalization parameters associated with the pre-equalized signal. The report may include an indication that the pre-equalization is applied to the signal. In some cases, the first device 405 receive, from the second device 410, a request for the first device 405 to transmit the report indicating the one or more pre-equalization parameters. The request may be included in an RRC message, where transmitting the report to the second device 410 may be based on the request. The first device 405 may transmit the report aperiodically or periodically, or any combination thereof, based on a Doppler spread associated with the channel. The size of the report may be based on a number of taps of a PDP of the pre-equalized signal and based on a number of antennas used by the first device to transmit the pre-equalized signal.

At 445, the first device 405 may transmit, to the second device 410, the pre-equalized signal over the channel.

In some cases, at 450, the third device 415 may receive the pre-equalized signal that is transmitted from the first device 405 to the second device 410 over a channel between the first device 405 and the second device 410.

At 455, the second device 410 may decode the pre-equalized signal based on the one or more pre-equalization parameters.

In some cases, if the third device 415 receives the pre-equalized signal, at 460, the third device 415 may perform one or more interference cancellation procedures for interference corresponding to the pre-equalized signal. The one or more interference cancellation procedures may be based on the report.

Figure 5:
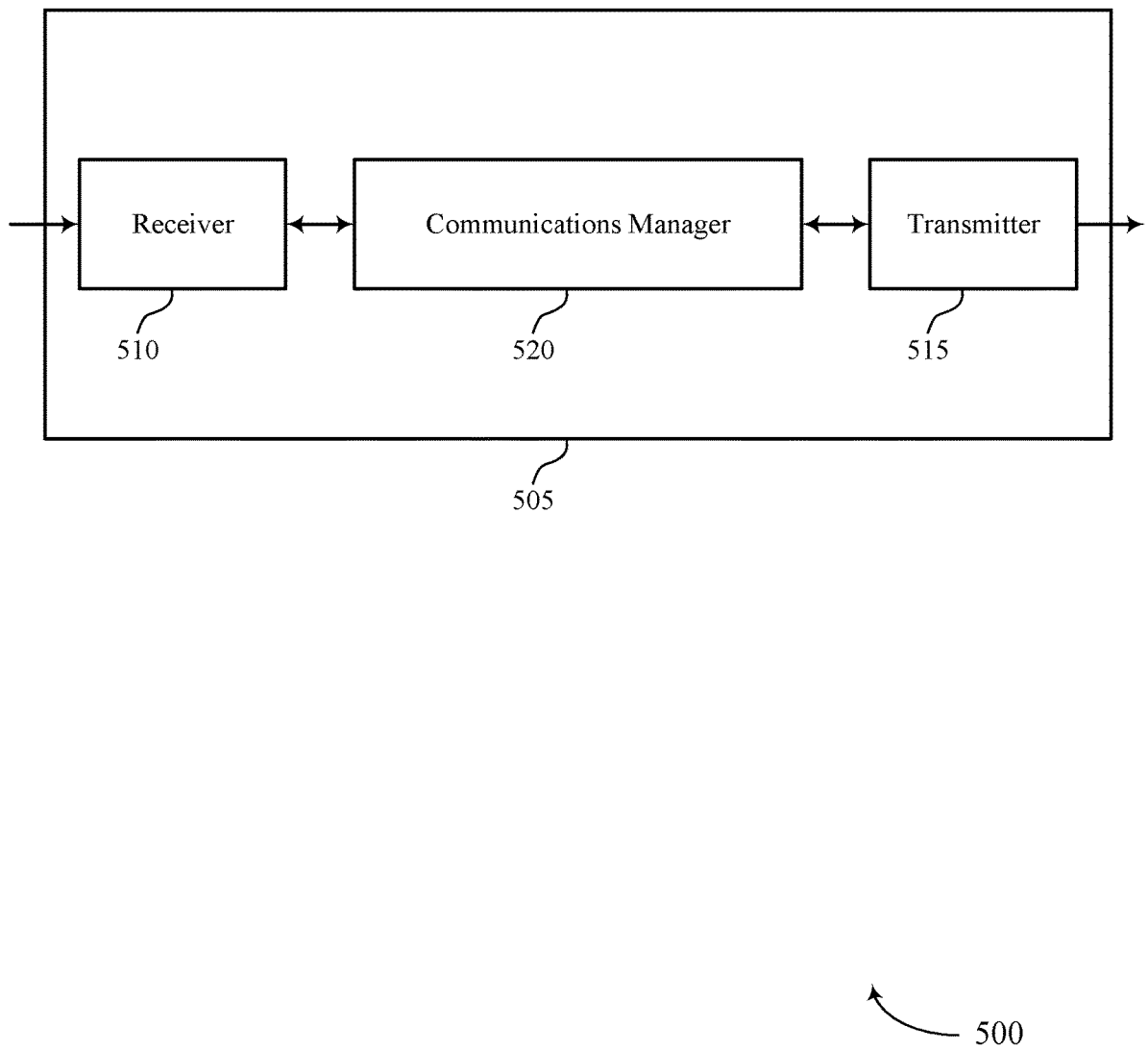
FIGS. 5 and 6 show block diagrams of devices that support techniques for pre-equalization reporting in accordance with aspects of the present disclosure.

FIG. 5 shows a block diagram 500 of a device 505 that supports techniques for pre-equalization reporting in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for pre-equalization reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for pre-equalization reporting). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for pre-equalization reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first device in accordance with examples as disclosed herein. For example, the communications manager 520 may be configured as or otherwise support a means for determining a condition of a channel between the first device and a second device, where the first device is scheduled to transmit a signal to the second device over the channel. The communications manager 520 may be configured as or otherwise support a means for applying pre-equalization to the signal based on one or more pre-equalization parameters, the one or more pre-equalization parameters being based on the condition of the channel. The communications manager 520 may be configured as or otherwise support a means for transmitting, to the second device, a report indicating the one or more pre-equalization parameters associated with the pre-equalized signal. The communications manager 520 may be configured as or otherwise support a means for transmitting, to the second device, the pre-equalized signal over the channel.

Additionally or alternatively, the communications manager 520 may support wireless communications at a first device in accordance with examples as disclosed herein. For example, the communications manager 520 may be configured as or otherwise support a means for receiving, from a second device, a report indicating a transmission of a pre-equalized signal from the second device to a third device, the report indicating one or more pre-equalization parameters associated with the pre-equalized signal. The communications manager 520 may be configured as or otherwise support a means for receiving the pre-equalized signal that is transmitted from the second device to the third device over a channel between the second device and the third device. The communications manager 520 may be configured as or otherwise support a means for performing one or more interference cancellation procedures for interference corresponding to the pre-equalized signal, the one or more interference cancellation procedures based on the report.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
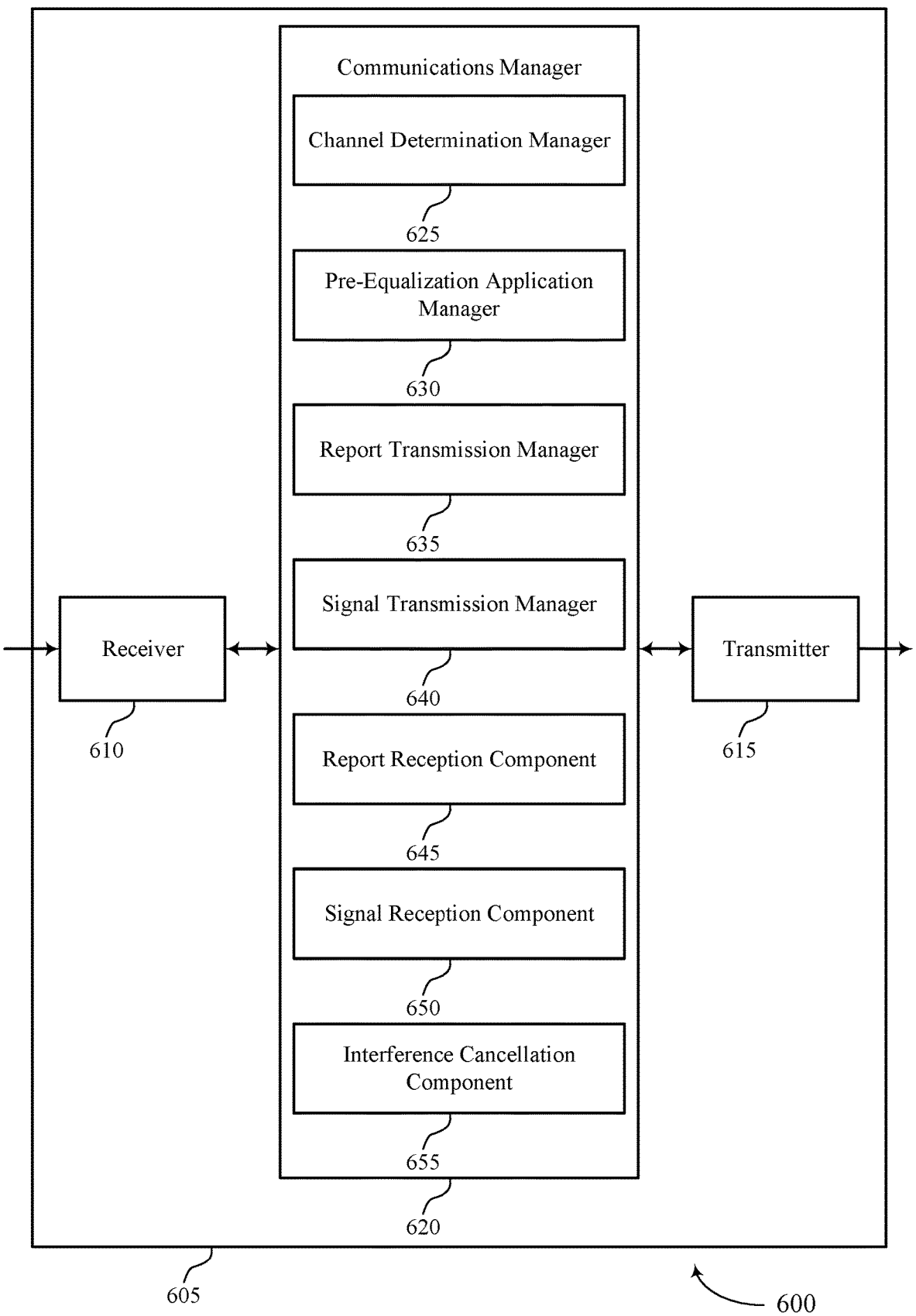

FIG. 6 shows a block diagram 600 of a device 605 that supports techniques for pre-equalization reporting in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for pre-equalization reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for pre-equalization reporting). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for pre-equalization reporting as described herein. For example, the communications manager 620 may include a channel determination manager 625, a pre-equalization application manager 630, a report transmission manager 635, a signal transmission manager 640, a report reception component 645, a signal reception component 650, an interference cancellation component 655, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first device in accordance with examples as disclosed herein. The channel determination manager 625 may be configured as or otherwise support a means for determining a condition of a channel between the first device and a second device, where the first device is scheduled to transmit a signal to the second device over the channel. The pre-equalization application manager 630 may be configured as or otherwise support a means for applying pre-equalization to the signal based on one or more pre-equalization parameters, the one or more pre-equalization parameters being based on the condition of the channel. The report transmission manager 635 may be configured as or otherwise support a means for transmitting, to the second device, a report indicating the one or more pre-equalization parameters associated with the pre-equalized signal. The signal transmission manager 640 may be configured as or otherwise support a means for transmitting, to the second device, the pre-equalized signal over the channel.

Additionally or alternatively, the communications manager 620 may support wireless communications at a first device in accordance with examples as disclosed herein. The report reception component 645 may be configured as or otherwise support a means for receiving, from a second device, a report indicating a transmission of a pre-equalized signal from the second device to a third device, the report indicating one or more pre-equalization parameters associated with the pre-equalized signal. The signal reception component 650 may be configured as or otherwise support a means for receiving the pre-equalized signal that is transmitted from the second device to the third device over a channel between the second device and the third device. The interference cancellation component 655 may be configured as or otherwise support a means for performing one or more interference cancellation procedures for interference corresponding to the pre-equalized signal, the one or more interference cancellation procedures based on the report.

Figure 7:
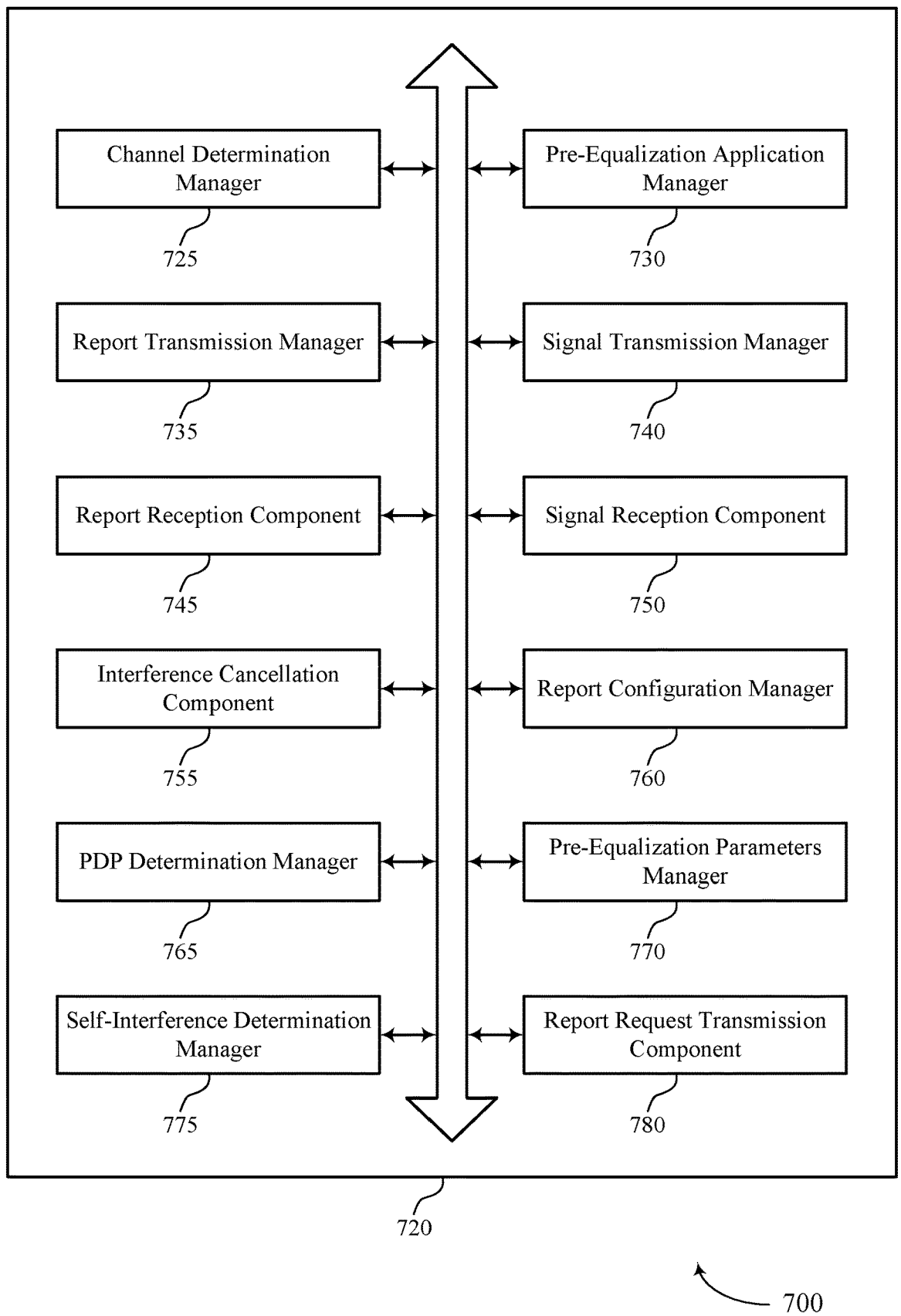
FIG. 7 shows a block diagram of a communications manager that supports techniques for pre-equalization reporting in accordance with aspects of the present disclosure.

FIG. 7 shows a block diagram 700 of a communications manager 720 that supports techniques for pre-equalization reporting in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for pre-equalization reporting as described herein. For example, the communications manager 720 may include a channel determination manager 725, a pre-equalization application manager 730, a report transmission manager 735, a signal transmission manager 740, a report reception component 745, a signal reception component 750, an interference cancellation component 755, a report configuration manager 760, a PDP determination manager 765, a pre-equalization parameters manager 770, a self-interference determination manager 775, a report request transmission component 780, or any combination thereof. Each of these components may communicate, directly or indirectly, with one another (e.g., via one or more buses).

The communications manager 720 may support wireless communications at a first device in accordance with examples as disclosed herein. The channel determination manager 725 may be configured as or otherwise support a means for determining a condition of a channel between the first device and a second device, where the first device is scheduled to transmit a signal to the second device over the channel. The pre-equalization application manager 730 may be configured as or otherwise support a means for applying pre-equalization to the signal based on one or more pre-equalization parameters, the one or more pre-equalization parameters being based on the condition of the channel. The report transmission manager 735 may be configured as or otherwise support a means for transmitting, to the second device, a report indicating the one or more pre-equalization parameters associated with the pre-equalized signal. The signal transmission manager 740 may be configured as or otherwise support a means for transmitting, to the second device, the pre-equalized signal over the channel.

In some examples, the report configuration manager 760 may be configured as or otherwise support a means for receiving, from the second device, a configuration message indicating the one or more pre-equalization parameters to include in the report, where the report indicating the one or more pre-equalization parameters is based on the configuration message.

In some examples, to support transmitting the report indicating the one or more pre-equalization parameters, the report transmission manager 735 may be configured as or otherwise support a means for transmitting, within the report indicating the one or more pre-equalization parameters, an indication that the pre-equalization is applied to the signal.

In some examples, the report transmission manager 735 may be configured as or otherwise support a means for transmitting, to a third device, a second report indicating that the first device applied pre-equalization to the signal over the channel, the second report indicating that the pre-equalization is based on the channel between the first device and the second device, where the third device is different from the second device.

In some examples, the PDP determination manager 765 may be configured as or otherwise support a means for determining a PDP for signals communicated over the channel, the PDP corresponding to the condition of the channel. In some examples, the pre-equalization parameters manager 770 may be configured as or otherwise support a means for determining the one or more pre-equalization parameters based on the determined PDP, where the one or more pre-equalization parameters include a number of taps of the PDP, a value of each tap of the PDP, a time-domain location of each tap of the PDP, a largest tap of the PDP, or a combination thereof.

In some examples, the value of each tap includes a differential value based on a value of the largest tap. In some examples, the time-domain location of each tap includes a differential value based on a time-domain location of the largest tap.

In some examples, the value of each tap includes a differential value based on a value of an adjacent tap. In some examples, the time-domain location of each tap includes a differential value based on a time-domain location of the adjacent tap.

In some examples, to support transmitting the report, the report transmission manager 735 may be configured as or otherwise support a means for transmitting the report aperiodically or periodically, or any combination thereof, based on a Doppler spread associated with the channel.

In some examples, the pre-equalization parameters manager 770 may be configured as or otherwise support a means for identifying one or more additional pre-equalization parameters that are different from the one or more pre-equalization parameters included in the report. In some examples, the report transmission manager 735 may be configured as or otherwise support a means for transmitting, to the second device, a second report indicating the identified one or more additional pre-equalization parameters based on the one or more additional pre-equalization parameters being different from the one or more pre-equalization parameters.

In some examples, the self-interference determination manager 775 may be configured as or otherwise support a means for determining a level of self-interference at the first device based on the first device operating according to a full-duplex communications mode. In some examples, the pre-equalization application manager 730 may be configured as or otherwise support a means for applying pre-equalization to the signal based on the determined level of self-interference at the first device. In some examples, the report transmission manager 735 may be configured as or otherwise support a means for transmitting, to the second device, a second report indicating a second set of one or more pre-equalization parameters, where the second set of one or more pre-equalization parameters are based on the level of self-interference at the first device.

Additionally or alternatively, the communications manager 720 may support wireless communications at a first device in accordance with examples as disclosed herein. The report reception component 745 may be configured as or otherwise support a means for receiving, from a second device, a report indicating a transmission of a pre-equalized signal from the second device to a third device, the report indicating one or more pre-equalization parameters associated with the pre-equalized signal. The signal reception component 750 may be configured as or otherwise support a means for receiving the pre-equalized signal that is transmitted from the second device to the third device over a channel between the second device and the third device. The interference cancellation component 755 may be configured as or otherwise support a means for performing one or more interference cancellation procedures for interference corresponding to the pre-equalized signal, the one or more interference cancellation procedures based on the report.

In some examples, the report request transmission component 780 may be configured as or otherwise support a means for transmitting, to the second device, a request for the second device to transmit the report indicating the one or more pre-equalization parameters, the request included in a radio resource control message, where receiving the report is based on the request.

In some examples, the one or more pre-equalization parameters are based on a PDP for signals communicated over the channel. In some examples, the one or more pre-equalization parameters include a number of taps of the PDP, a value of each tap of the PDP, a time-domain location of each tap of the PDP, a largest tap of the PDP, or a combination thereof.

In some examples, to support receiving the report, the report reception component 745 may be configured as or otherwise support a means for receiving the report periodically or aperiodically, or any combination thereof, based on a Doppler spread associated with the channel.

Figure 8:
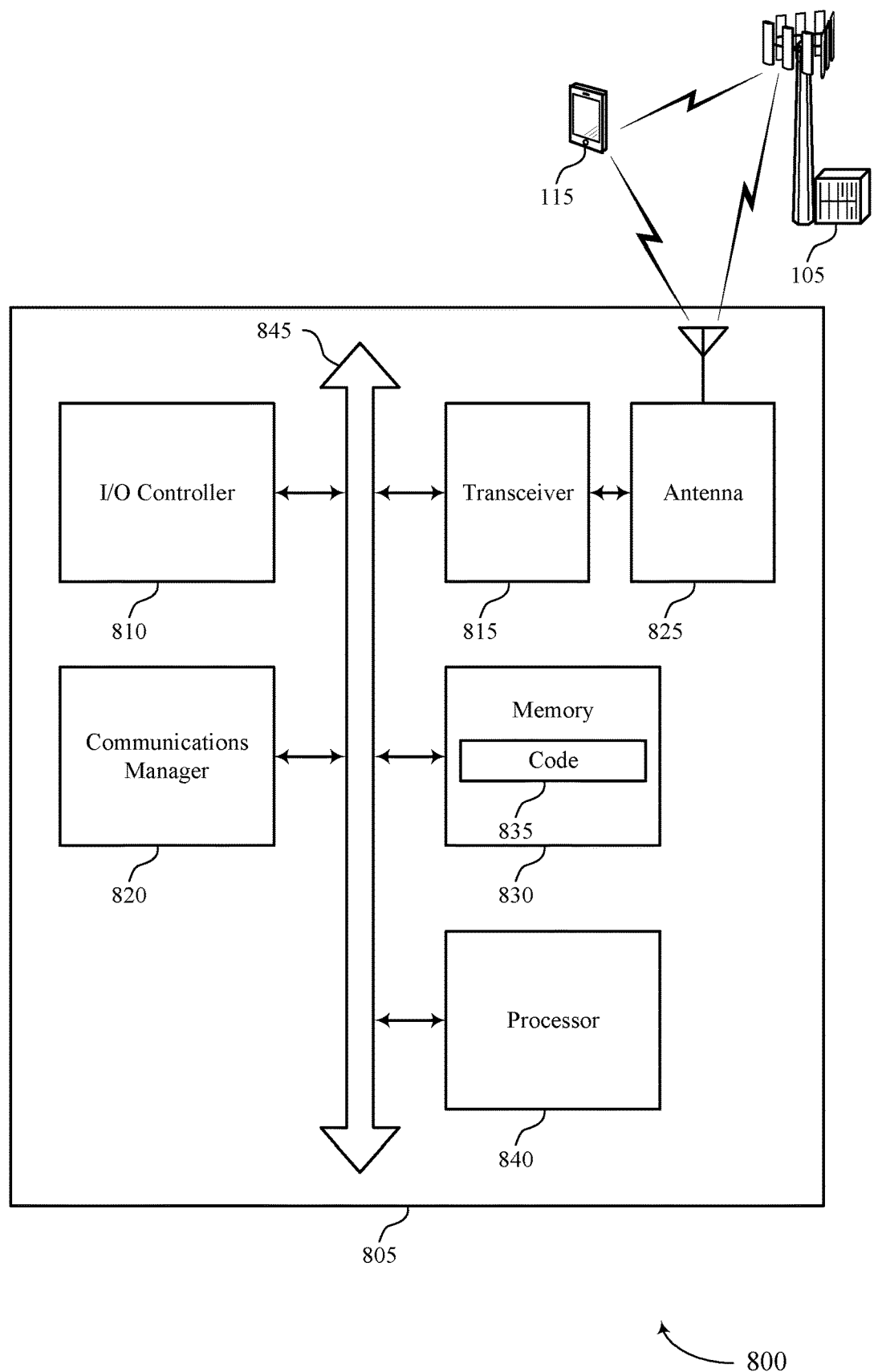
FIG. 8 shows a diagram of a system including a device that supports techniques for pre-equalization reporting in accordance with aspects of the present disclosure.

FIG. 8 shows a diagram of a system 800 including a device 805 that supports techniques for pre-equalization reporting in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for pre-equalization reporting). For example, the device 805 or a component of the device 805 may include a processor 840 and memory 830 coupled to the processor 840, the processor 840 and memory 830 configured to perform various functions described herein.

The communications manager 820 may support wireless communications at a first device in accordance with examples as disclosed herein. For example, the communications manager 820 may be configured as or otherwise support a means for determining a condition of a channel between the first device and a second device, where the first device is scheduled to transmit a signal to the second device over the channel. The communications manager 820 may be configured as or otherwise support a means for applying pre-equalization to the signal based on one or more pre-equalization parameters, the one or more pre-equalization parameters being based on the condition of the channel. The communications manager 820 may be configured as or otherwise support a means for transmitting, to the second device, a report indicating the one or more pre-equalization parameters associated with the pre-equalized signal. The communications manager 820 may be configured as or otherwise support a means for transmitting, to the second device, the pre-equalized signal over the channel.

Additionally or alternatively, the communications manager 820 may support wireless communications at a first device in accordance with examples as disclosed herein. For example, the communications manager 820 may be configured as or otherwise support a means for receiving, from a second device, a report indicating a transmission of a pre-equalized signal from the second device to a third device, the report indicating one or more pre-equalization parameters associated with the pre-equalized signal. The communications manager 820 may be configured as or otherwise support a means for receiving the pre-equalized signal that is transmitted from the second device to the third device over a channel between the second device and the third device. The communications manager 820 may be configured as or otherwise support a means for performing one or more interference cancellation procedures for interference corresponding to the pre-equalized signal, the one or more interference cancellation procedures based on the report.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for pre-equalization reporting as described herein, or the processor 840 and the memory 830 may be otherwise configured to perform or support such operations.

Figure 9:
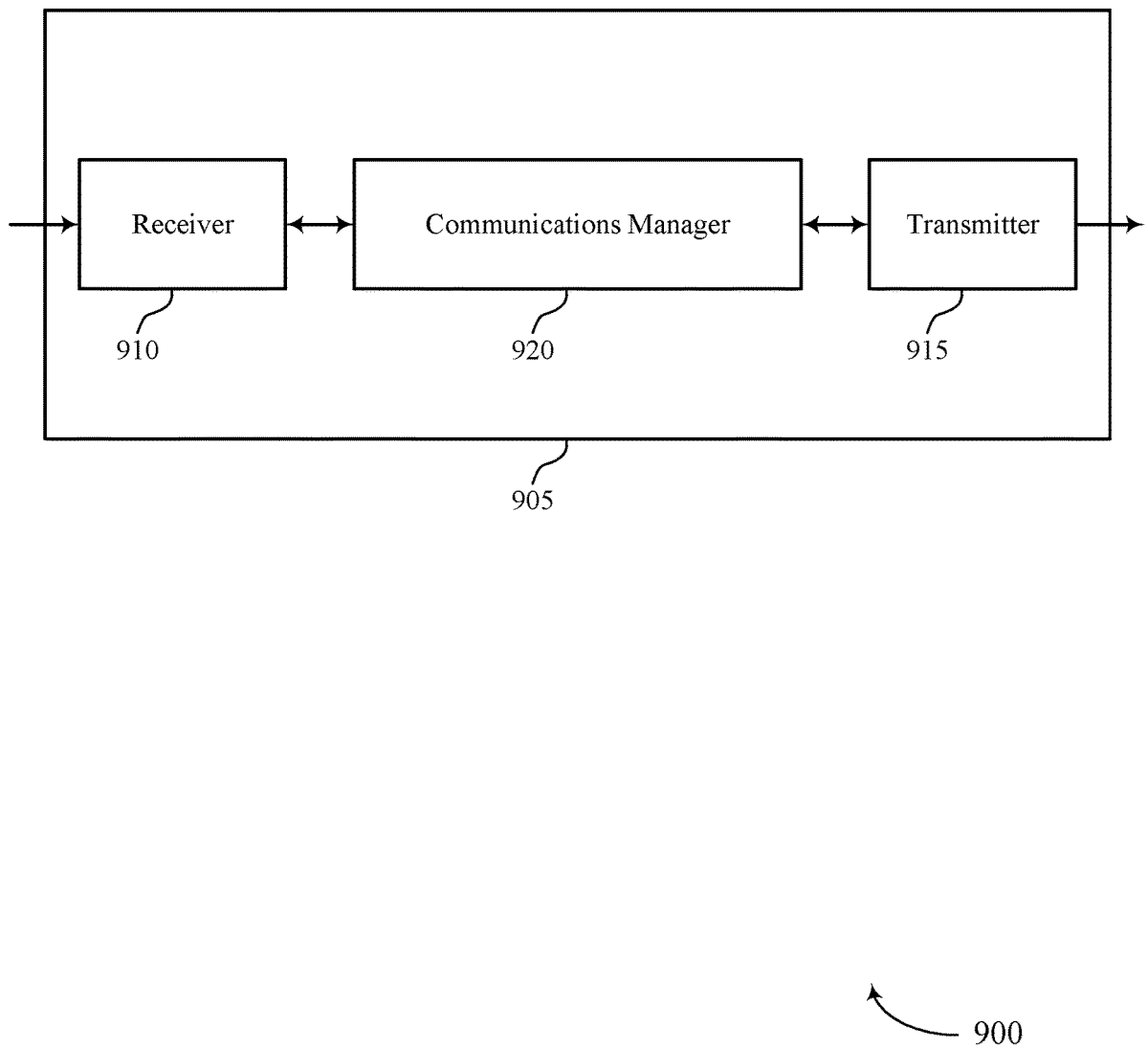
FIGS. 9 and 10 show block diagrams of devices that support techniques for pre-equalization reporting in accordance with aspects of the present disclosure.

FIG. 9 shows a block diagram 900 of a device 905 that supports techniques for pre-equalization reporting in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for pre-equalization reporting). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for pre-equalization reporting). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for pre-equalization reporting as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first device in accordance with examples as disclosed herein. For example, the communications manager 920 may be configured as or otherwise support a means for identifying that the first device is scheduled to receive a signal from a second device over a channel between the first device and the second device. The communications manager 920 may be configured as or otherwise support a means for receiving, from the second device, a report indicating one or more pre-equalization parameters associated with pre-equalization applied by the second device to the signal. The communications manager 920 may be configured as or otherwise support a means for receiving, from the second device, the pre-equalized signal over the channel. The communications manager 920 may be configured as or otherwise support a means for decoding the pre-equalized signal based on the one or more pre-equalization parameters.

Additionally or alternatively, the communications manager 920 may support wireless communications at a first device in accordance with examples as disclosed herein. For example, the communications manager 920 may be configured as or otherwise support a means for determining a condition of a channel between the first device and a second device, where the first device is scheduled to transmit a signal to the second device over the channel. The communications manager 920 may be configured as or otherwise support a means for applying pre-equalization to the signal based on one or more pre-equalization parameters, the one or more pre-equalization parameters being based on the condition of the channel. The communications manager 920 may be configured as or otherwise support a means for transmitting, to a third device, a report indicating the one or more pre-equalization parameters associated with the pre-equalized signal, the third device being different from the second device. The communications manager 920 may be configured as or otherwise support a means for transmitting, to the second device, the pre-equalized signal over the channel.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

Figure 10:
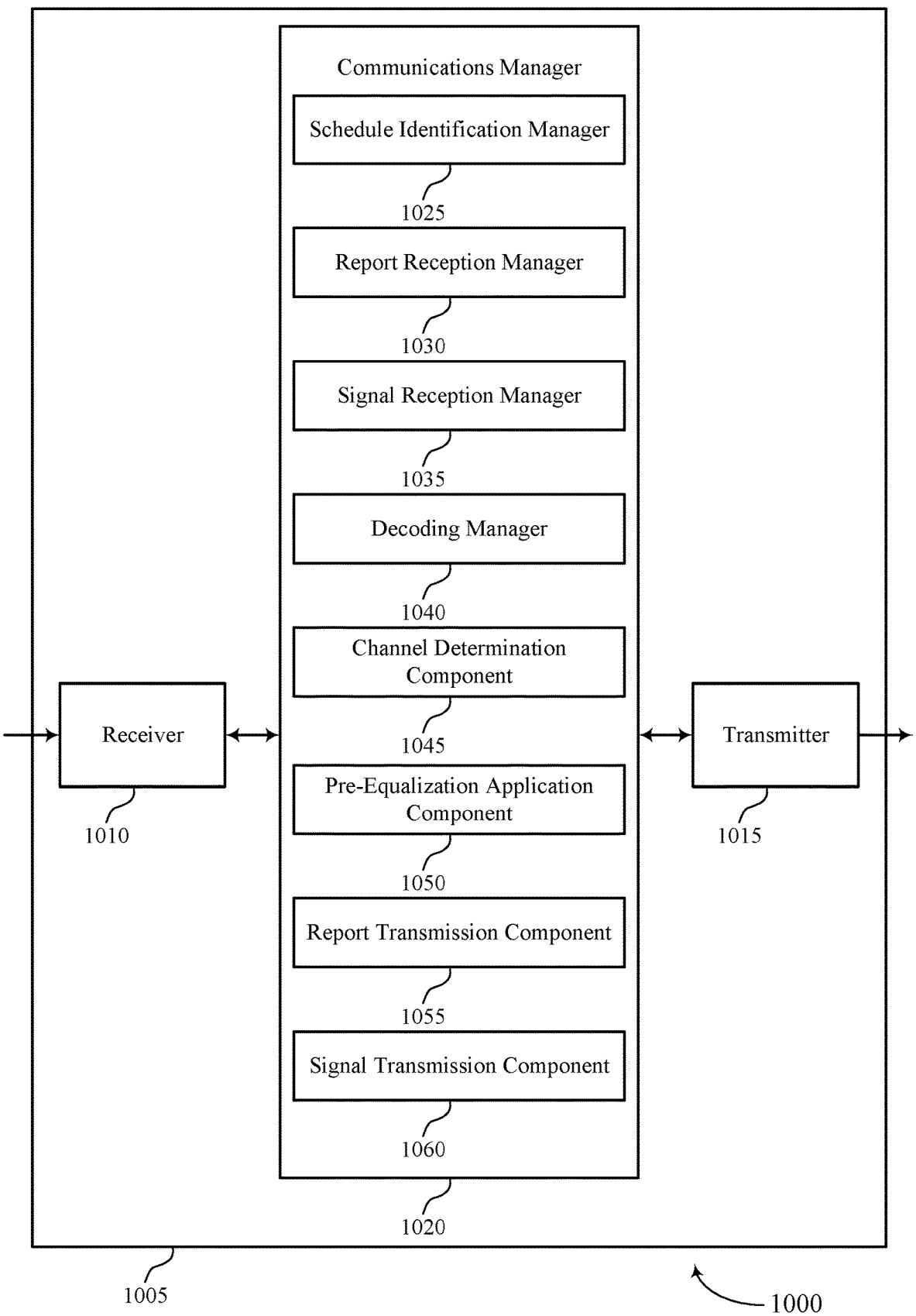

FIG. 10 shows a block diagram 1000 of a device 1005 that supports techniques for pre-equalization reporting in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for pre-equalization reporting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for pre-equalization reporting). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for pre-equalization reporting as described herein. For example, the communications manager 1020 may include a schedule identification manager 1025, a report reception manager 1030, a signal reception manager 1035, a decoding manager 1040, a channel determination component 1045, a pre-equalization application component 1050, a report transmission component 1055, a signal transmission component 1060, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first device in accordance with examples as disclosed herein. The schedule identification manager 1025 may be configured as or otherwise support a means for identifying that the first device is scheduled to receive a signal from a second device over a channel between the first device and the second device. The report reception manager 1030 may be configured as or otherwise support a means for receiving, from the second device, a report indicating one or more pre-equalization parameters associated with pre-equalization applied by the second device to the signal. The signal reception manager 1035 may be configured as or otherwise support a means for receiving, from the second device, the pre-equalized signal over the channel. The decoding manager 1040 may be configured as or otherwise support a means for decoding the pre-equalized signal based on the one or more pre-equalization parameters.

Additionally or alternatively, the communications manager 1020 may support wireless communications at a first device in accordance with examples as disclosed herein. The channel determination component 1045 may be configured as or otherwise support a means for determining a condition of a channel between the first device and a second device, where the first device is scheduled to transmit a signal to the second device over the channel. The pre-equalization application component 1050 may be configured as or otherwise support a means for applying pre-equalization to the signal based on one or more pre-equalization parameters, the one or more pre-equalization parameters being based on the condition of the channel. The report transmission component 1055 may be configured as or otherwise support a means for transmitting, to a third device, a report indicating the one or more pre-equalization parameters associated with the pre-equalized signal, the third device being different from the second device. The signal transmission component 1060 may be configured as or otherwise support a means for transmitting, to the second device, the pre-equalized signal over the channel.

Figure 11:
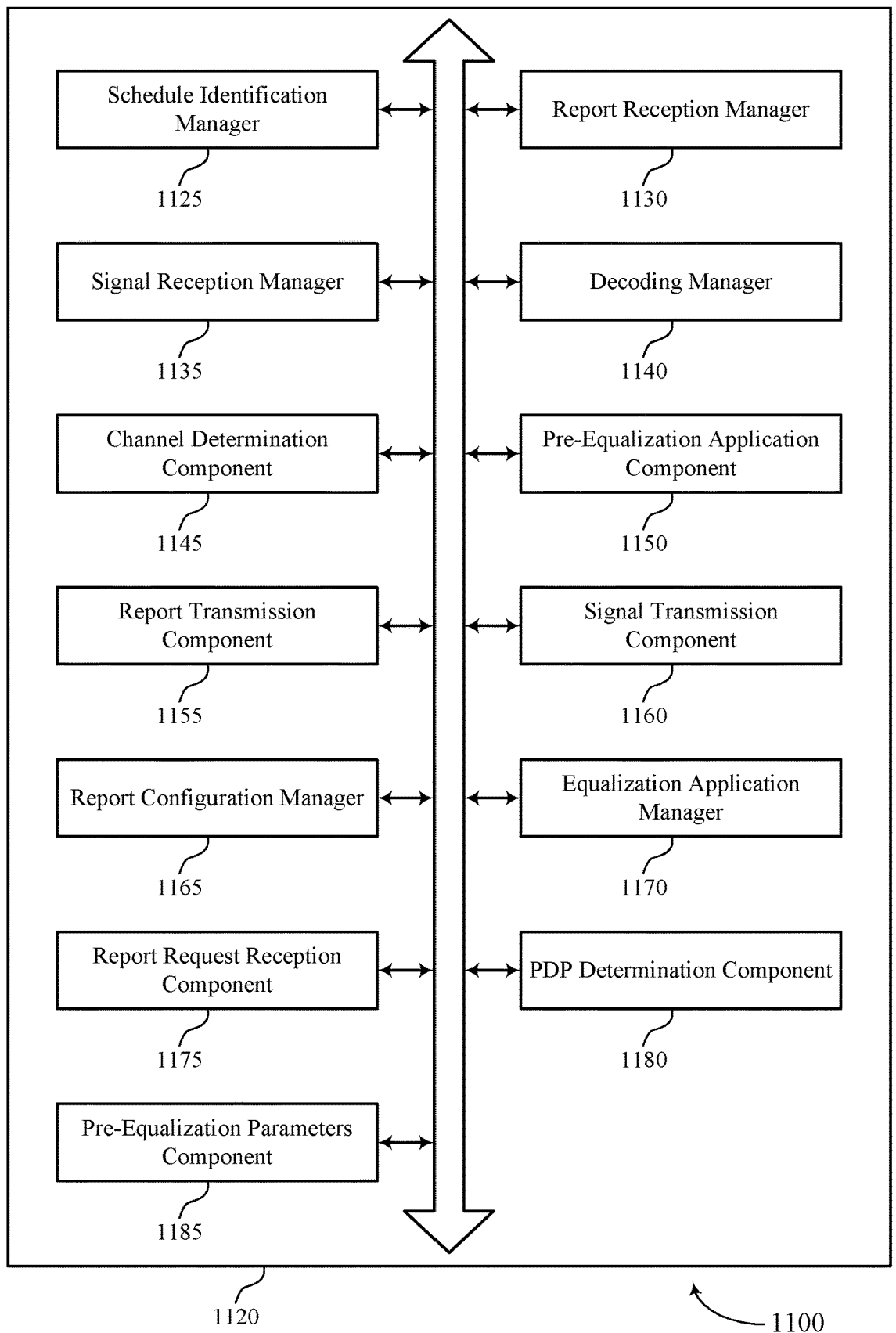
FIG. 11 shows a block diagram of a communications manager that supports techniques for pre-equalization reporting in accordance with aspects of the present disclosure.

FIG. 11 shows a block diagram 1100 of a communications manager 1120 that supports techniques for pre-equalization reporting in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for pre-equalization reporting as described herein. For example, the communications manager 1120 may include a schedule identification manager 1125, a report reception manager 1130, a signal reception manager 1135, a decoding manager 1140, a channel determination component 1145, a pre-equalization application component 1150, a report transmission component 1155, a signal transmission component 1160, a report configuration manager 1165, an equalization application manager 1170, a report request reception component 1175, a PDP determination component 1180, a pre-equalization parameters component 1185, or any combination thereof. Each of these components may communicate, directly or indirectly, with one another (e.g., via one or more buses).

The communications manager 1120 may support wireless communications at a first device in accordance with examples as disclosed herein. The schedule identification manager 1125 may be configured as or otherwise support a means for identifying that the first device is scheduled to receive a signal from a second device over a channel between the first device and the second device. The report reception manager 1130 may be configured as or otherwise support a means for receiving, from the second device, a report indicating one or more pre-equalization parameters associated with pre-equalization applied by the second device to the signal. The signal reception manager 1135 may be configured as or otherwise support a means for receiving, from the second device, the pre-equalized signal over the channel. The decoding manager 1140 may be configured as or otherwise support a means for decoding the pre-equalized signal based on the one or more pre-equalization parameters.

In some examples, the report configuration manager 1165 may be configured as or otherwise support a means for transmitting, to the second device, a configuration message indicating the one or more pre-equalization parameters to include in the report, where the report indicating the one or more pre-equalization parameters is based on the configuration message.

In some examples, to support receiving the report indicating the one or more pre-equalization parameters, the report reception manager 1130 may be configured as or otherwise support a means for receiving, within the report indicating the one or more pre-equalization parameters, an indication that the pre-equalization is applied to the signal.

In some examples, the one or more pre-equalization parameters are based on a PDP for signals communicated over the channel. In some examples, the one or more pre-equalization parameters include a number of taps of the PDP, a value of each tap of the PDP, a time-domain location of each tap of the PDP, a largest tap of the PDP, or a combination thereof.

In some examples, to support receiving the report, the report reception manager 1130 may be configured as or otherwise support a means for receiving the report aperiodically or periodically, or any combination thereof, based on a Doppler spread associated with the channel.

In some examples, the report reception manager 1130 may be configured as or otherwise support a means for receiving, from the second device, a second report indicating a second set of one or more pre-equalization parameters, where the second set of one or more pre-equalization parameters are based on a level of self-interference at the second device. In some examples, the signal reception manager 1135 may be configured as or otherwise support a means for receiving, from the second device, a second pre-equalized signal over the channel. In some examples, the equalization application manager 1170 may be configured as or otherwise support a means for applying equalization to the second pre-equalized signal based on the second set of one or more pre-equalization parameters.

Additionally or alternatively, the communications manager 1120 may support wireless communications at a first device in accordance with examples as disclosed herein. The channel determination component 1145 may be configured as or otherwise support a means for determining a condition of a channel between the first device and a second device, where the first device is scheduled to transmit a signal to the second device over the channel. The pre-equalization application component 1150 may be configured as or otherwise support a means for applying pre-equalization to the signal based on one or more pre-equalization parameters, the one or more pre-equalization parameters being based on the condition of the channel. The report transmission component 1155 may be configured as or otherwise support a means for transmitting, to a third device, a report indicating the one or more pre-equalization parameters associated with the pre-equalized signal, the third device being different from the second device. The signal transmission component 1160 may be configured as or otherwise support a means for transmitting, to the second device, the pre-equalized signal over the channel.

In some examples, to support transmitting the report indicating the one or more pre-equalization parameters, the report transmission component 1155 may be configured as or otherwise support a means for transmitting, within the report to the third device, an indication that the first device is transmitting the signal to the second device and an indication that the pre-equalization is applied to the signal.

In some examples, the report request reception component 1175 may be configured as or otherwise support a means for receiving, from the third device, a request for the first device to transmit the report indicating the one or more pre-equalization parameters, the request included in a radio resource control message, where transmitting the report to the third device is based on the request.

In some examples, the report transmission component 1155 may be configured as or otherwise support a means for transmitting, to the second device, the report indicating the one or more pre-equalization parameters associated with the pre-equalized signal, the report including an indication that the pre-equalization is applied to the signal.

In some examples, the report request reception component 1175 may be configured as or otherwise support a means for receiving, from the second device, a request for the first device to transmit the report indicating the one or more pre-equalization parameters, the request included in a radio resource control message, where transmitting the report to the second device is based on the request.

In some examples, the PDP determination component 1180 may be configured as or otherwise support a means for determining a PDP for signals communicated over the channel, the PDP corresponding to the condition of the channel. In some examples, the pre-equalization parameters component 1185 may be configured as or otherwise support a means for determining the one or more pre-equalization parameters based on the determined PDP, where the one or more pre-equalization parameters include a number of taps of the PDP, a value of each tap of the PDP, a time-domain location of each tap of the PDP, a largest tap of the PDP, or a combination thereof.

In some examples, the value of each tap includes a differential value based on a value of the largest tap. In some examples, the time-domain location of each tap includes a differential value based on a time-domain location of the largest tap.

In some examples, the value of each tap includes a differential value based on a value of an adjacent tap. In some examples, the time-domain location of each tap includes a differential value based on a time-domain location of the adjacent tap.

In some examples, to support transmitting the report, the report transmission component 1155 may be configured as or otherwise support a means for transmitting the report aperiodically or periodically, or any combination thereof, based on a Doppler spread associated with the channel.

In some examples, a size of the report is based on a number of taps of a PDP of the pre-equalized signal and based on a number of antennas used by the first device to transmit the pre-equalized signal.

Figure 12:
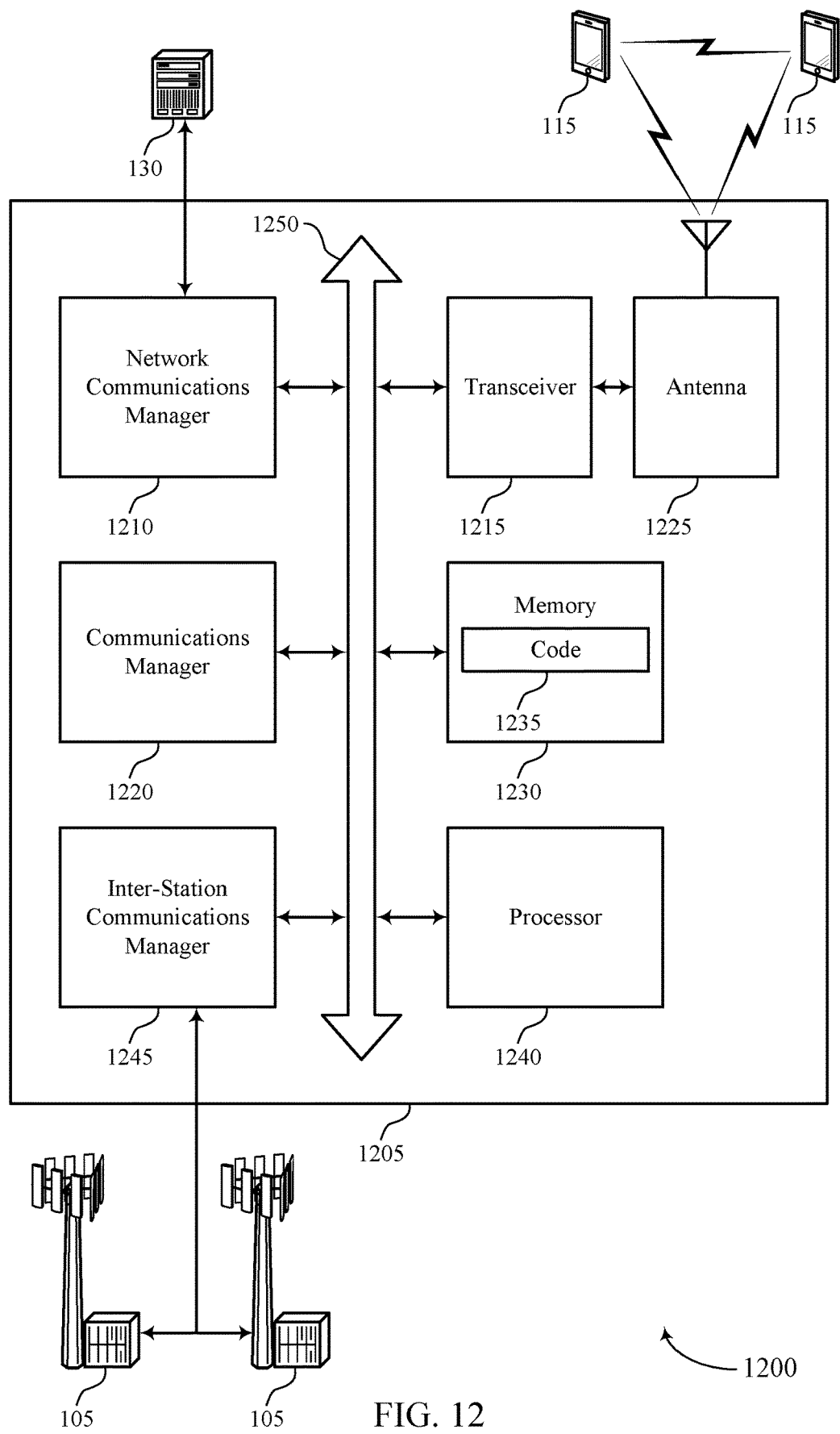
FIG. 12 shows a diagram of a system including a device that supports techniques for pre-equalization reporting in accordance with aspects of the present disclosure.

FIG. 12 shows a diagram of a system 1200 including a device 1205 that supports techniques for pre-equalization reporting in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for pre-equalization reporting). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a first device in accordance with examples as disclosed herein. For example, the communications manager 1220 may be configured as or otherwise support a means for identifying that the first device is scheduled to receive a signal from a second device over a channel between the first device and the second device. The communications manager 1220 may be configured as or otherwise support a means for receiving, from the second device, a report indicating one or more pre-equalization parameters associated with pre-equalization applied by the second device to the signal. The communications manager 1220 may be configured as or otherwise support a means for receiving, from the second device, the pre-equalized signal over the channel. The communications manager 1220 may be configured as or otherwise support a means for decoding the pre-equalized signal based on the one or more pre-equalization parameters.

Additionally or alternatively, the communications manager 1220 may support wireless communications at a first device in accordance with examples as disclosed herein. For example, the communications manager 1220 may be configured as or otherwise support a means for determining a condition of a channel between the first device and a second device, where the first device is scheduled to transmit a signal to the second device over the channel. The communications manager 1220 may be configured as or otherwise support a means for applying pre-equalization to the signal based on one or more pre-equalization parameters, the one or more pre-equalization parameters being based on the condition of the channel. The communications manager 1220 may be configured as or otherwise support a means for transmitting, to a third device, a report indicating the one or more pre-equalization parameters associated with the pre-equalized signal, the third device being different from the second device. The communications manager 1220 may be configured as or otherwise support a means for transmitting, to the second device, the pre-equalized signal over the channel.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for pre-equalization reporting as described herein, or the processor 1240 and the memory 1230 may be otherwise configured to perform or support such operations.

Figure 13:
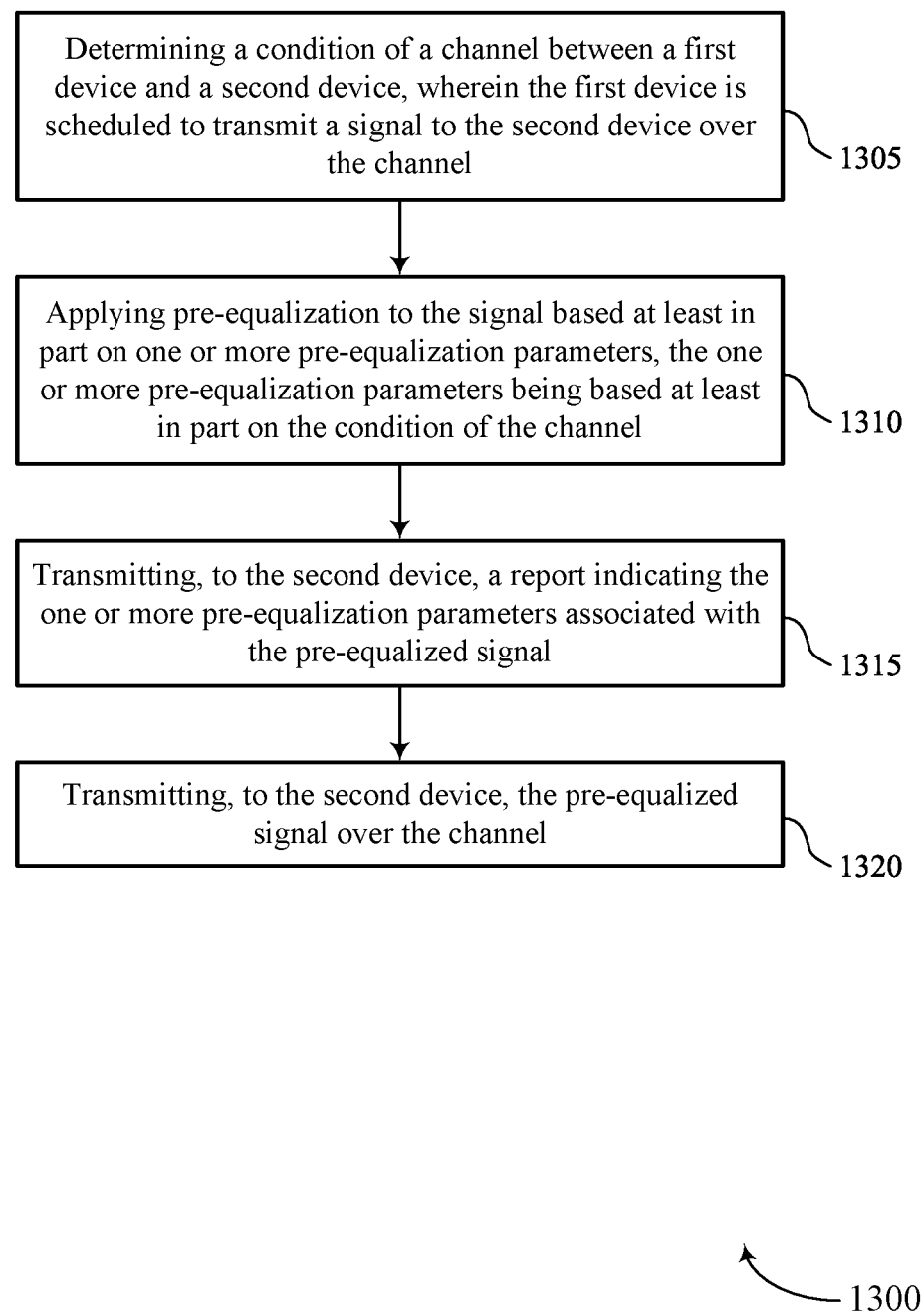
FIGS. 13 through 16 show flowcharts illustrating methods that support techniques for pre-equalization reporting in accordance with aspects of the present disclosure.

FIG. 13 shows a flowchart illustrating a method 1300 that supports techniques for pre-equalization reporting in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include determining a condition of a channel between the first device and a second device, where the first device is scheduled to transmit a signal to the second device over the channel. The operations of 1305 may be performed in accordance with examples as disclosed herein. In some examples, aspects of the operations of 1305 may be performed by a channel determination manager 725 as described with reference to FIG. 7.

At 1310, the method may include applying pre-equalization to the signal based on one or more pre-equalization parameters, the one or more pre-equalization parameters being based on the condition of the channel. The operations of 1310 may be performed in accordance with examples as disclosed herein. In some examples, aspects of the operations of 1310 may be performed by a pre-equalization application manager 730 as described with reference to FIG. 7.

At 1315, the method may include transmitting, to the second device, a report indicating the one or more pre-equalization parameters associated with the pre-equalized signal. The operations of 1315 may be performed in accordance with examples as disclosed herein. In some examples, aspects of the operations of 1315 may be performed by a report transmission manager 735 as described with reference to FIG. 7.

At 1320, the method may include transmitting, to the second device, the pre-equalized signal over the channel. The operations of 1320 may be performed in accordance with examples as disclosed herein. In some examples, aspects of the operations of 1320 may be performed by a signal transmission manager 740 as described with reference to FIG. 7.

Figure 14:
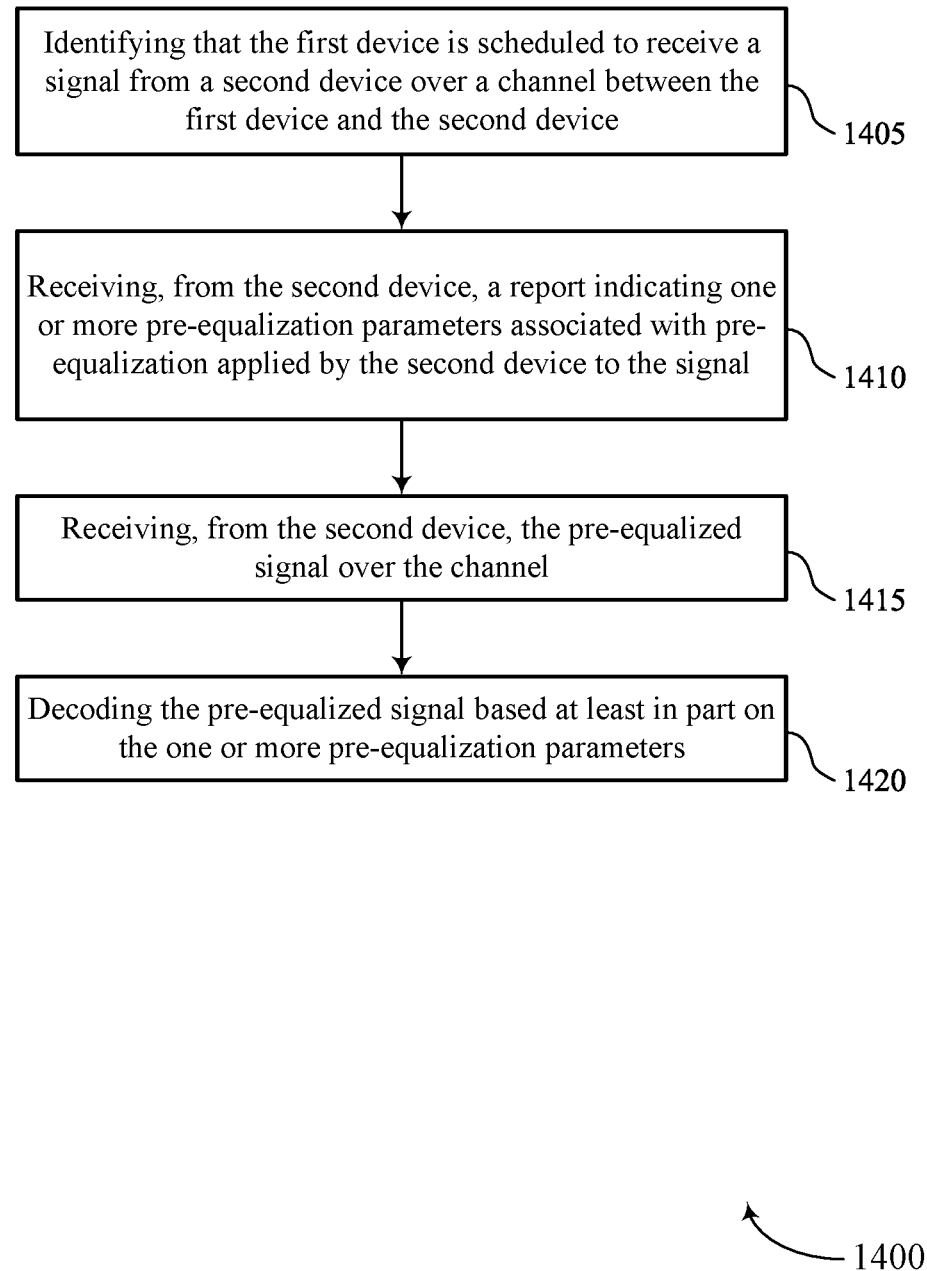

FIG. 14 shows a flowchart illustrating a method 1400 that supports techniques for pre-equalization reporting in accordance with aspects of the present disclosure. The operations of the method 1400 may be implemented by a base station or its components as described herein. For example, the operations of the method 1400 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1405, the method may include identifying that the first device is scheduled to receive a signal from a second device over a channel between the first device and the second device. The operations of 1405 may be performed in accordance with examples as disclosed herein. In some examples, aspects of the operations of 1405 may be performed by a schedule identification manager 1125 as described with reference to FIG. 11.

At 1410, the method may include receiving, from the second device, a report indicating one or more pre-equalization parameters associated with pre-equalization applied by the second device to the signal. The operations of 1410 may be performed in accordance with examples as disclosed herein. In some examples, aspects of the operations of 1410 may be performed by a report reception manager 1130 as described with reference to FIG. 11.

At 1415, the method may include receiving, from the second device, the pre-equalized signal over the channel. The operations of 1415 may be performed in accordance with examples as disclosed herein. In some examples, aspects of the operations of 1415 may be performed by a signal reception manager 1135 as described with reference to FIG. 11.

At 1420, the method may include decoding the pre-equalized signal based on the one or more pre-equalization parameters. The operations of 1420 may be performed in accordance with examples as disclosed herein. In some examples, aspects of the operations of 1420 may be performed by a decoding manager 1140 as described with reference to FIG. 11.

Figure 15:
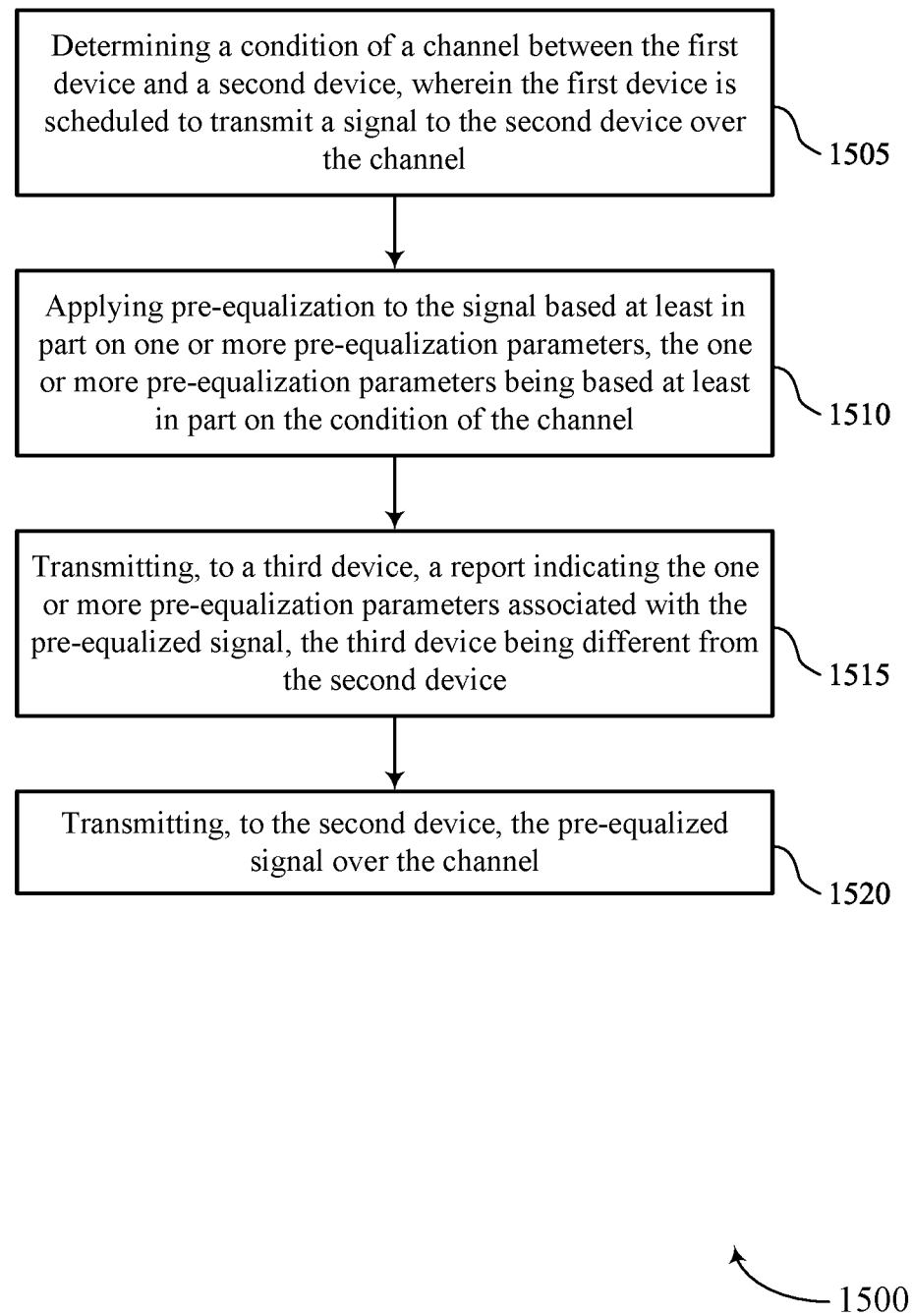

FIG. 15 shows a flowchart illustrating a method 1500 that supports techniques for pre-equalization reporting in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include determining a condition of a channel between the first device and a second device, where the first device is scheduled to transmit a signal to the second device over the channel. The operations of 1505 may be performed in accordance with examples as disclosed herein. In some examples, aspects of the operations of 1505 may be performed by a channel determination component 1145 as described with reference to FIG. 11.

At 1510, the method may include applying pre-equalization to the signal based on one or more pre-equalization parameters, the one or more pre-equalization parameters being based on the condition of the channel. The operations of 1510 may be performed in accordance with examples as disclosed herein. In some examples, aspects of the operations of 1510 may be performed by a pre-equalization application component 1150 as described with reference to FIG. 11.

At 1515, the method may include transmitting, to a third device, a report indicating the one or more pre-equalization parameters associated with the pre-equalized signal, the third device being different from the second device. The operations of 1515 may be performed in accordance with examples as disclosed herein. In some examples, aspects of the operations of 1515 may be performed by a report transmission component 1155 as described with reference to FIG. 11.

At 1520, the method may include transmitting, to the second device, the pre-equalized signal over the channel. The operations of 1520 may be performed in accordance with examples as disclosed herein. In some examples, aspects of the operations of 1520 may be performed by a signal transmission component 1160 as described with reference to FIG. 11.

Figure 16:
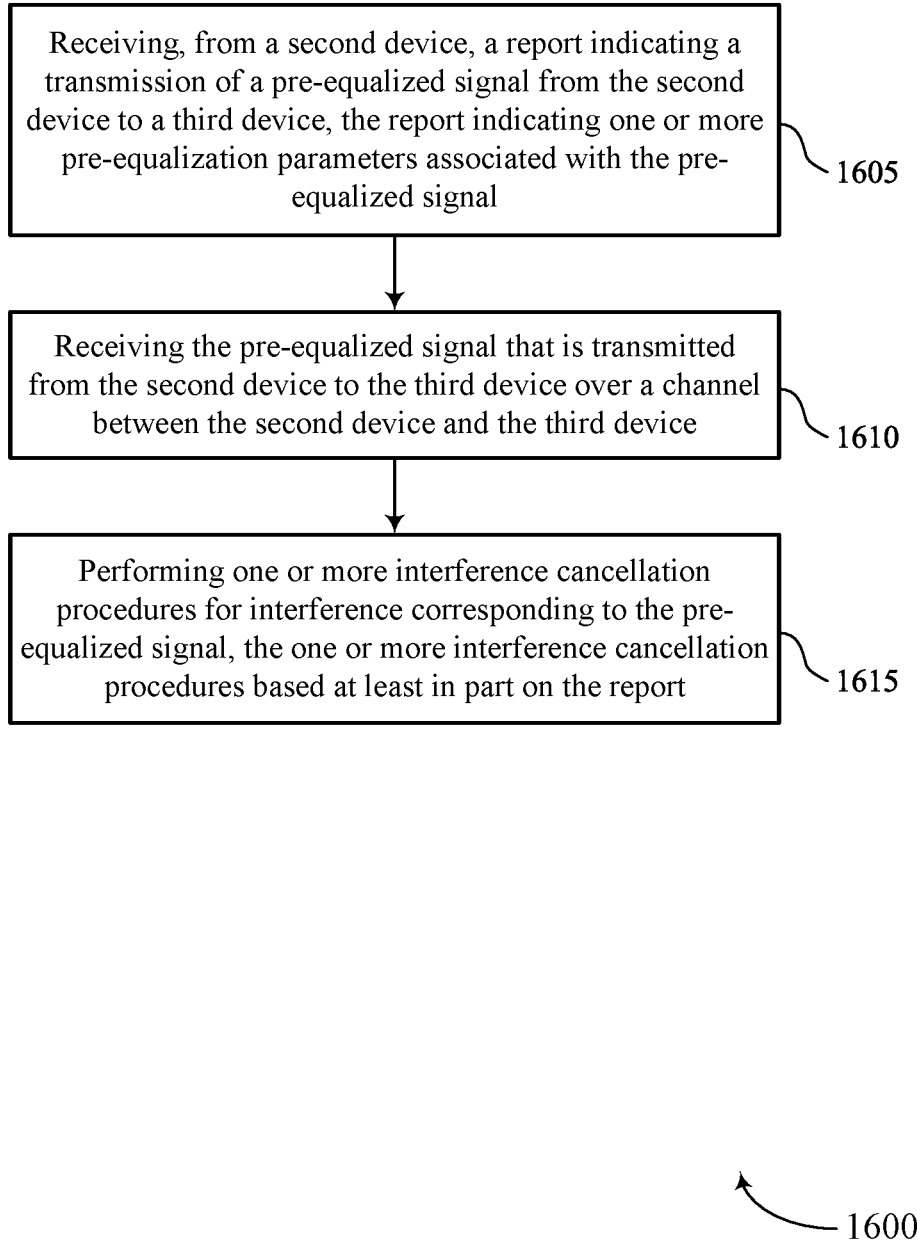

FIG. 16 shows a flowchart illustrating a method 1600 that supports techniques for pre-equalization reporting in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a second device, a report indicating a transmission of a pre-equalized signal from the second device to a third device, the report indicating one or more pre-equalization parameters associated with the pre-equalized signal. The operations of 1605 may be performed in accordance with examples as disclosed herein. In some examples, aspects of the operations of 1605 may be performed by a report reception component 745 as described with reference to FIG. 7.

At 1610, the method may include receiving the pre-equalized signal that is transmitted from the second device to the third device over a channel between the second device and the third device. The operations of 1610 may be performed in accordance with examples as disclosed herein. In some examples, aspects of the operations of 1610 may be performed by a signal reception component 750 as described with reference to FIG. 7.

At 1615, the method may include performing one or more interference cancellation procedures for interference corresponding to the pre-equalized signal, the one or more interference cancellation procedures based on the report. The operations of 1615 may be performed in accordance with examples as disclosed herein. In some examples, aspects of the operations of 1615 may be performed by an interference cancellation component 755 as described with reference to FIG. 7.

The following provides an overview of aspects of the present disclosure:

Aspect 1: A method for wireless communications at a first device, comprising: determining a condition of a channel between the first device and a second device, wherein the first device is scheduled to transmit a signal to the second device over the channel; applying pre-equalization to the signal based at least in part on one or more pre-equalization parameters, the one or more pre-equalization parameters being based at least in part on the condition of the channel; transmitting, to the second device, a report indicating the one or more pre-equalization parameters associated with the pre-equalized signal; and transmitting, to the second device, the pre-equalized signal over the channel.

Aspect 2: The method of aspect 1, further comprising: receiving, from the second device, a configuration message indicating the one or more pre-equalization parameters to include in the report, wherein the report indicating the one or more pre-equalization parameters is based at least in part on the configuration message.

Aspect 3: The method of any of aspects 1 through 2, wherein transmitting the report indicating the one or more pre-equalization parameters further comprises: transmitting, within the report indicating the one or more pre-equalization parameters, an indication that the pre-equalization is applied to the signal.

Aspect 4: The method of any of aspects 1 through 3, further comprising: transmitting, to a third device, a second report indicating that the first device applied pre-equalization to the signal over the channel, the second report indicating that the pre-equalization is based at least in part on the channel between the first device and the second device, wherein the third device is different from the second device.

Aspect 5: The method of any of aspects 1 through 4, further comprising: determining a power delay profile for signals communicated over the channel, the power delay profile corresponding to the condition of the channel; and determining the one or more pre-equalization parameters based at least in part on the determined power delay profile, wherein the one or more pre-equalization parameters comprise a number of taps of the power delay profile, a value of each tap of the power delay profile, a time-domain location of each tap of the power delay profile, a largest tap of the power delay profile, or a combination thereof.

Aspect 6: The method of aspect 5, wherein the value of each tap comprise differential values based at least in part on a value of the largest tap, and the time-domain location of each tap comprise differential values based at least in part on a time-domain location of the largest tap.

Aspect 7: The method of aspect 5, wherein the value of each tap comprise differential values based at least in part on a value of an adjacent tap, and the time-domain location of each tap comprise differential values based on a time-domain location of the adjacent tap.

Aspect 8: The method of any of aspects 1 through 7, wherein transmitting the report further comprises: transmitting the report aperiodically or periodically, or any combination thereof, based at least in part on a Doppler spread associated with the channel.

Aspect 9: The method of any of aspects 1 through 8, further comprising: identifying one or more additional pre-equalization parameters that are different from the one or more pre-equalization parameters included in the report; and transmitting, to the second device, a second report indicating the identified one or more additional pre-equalization parameters based at least in part on the one or more additional pre-equalization parameters being different from the one or more pre-equalization parameters.

Aspect 10: The method of any of aspects 1 through 9, further comprising: determining a level of self-interference at the first device based at least in part on the first device operating according to a full-duplex communications mode; applying pre-equalization to the signal based at least in part on the determined level of self-interference at the first device; and transmitting, to the second device, a second report indicating a second set of one or more pre-equalization parameters, wherein the second set of one or more pre-equalization parameters are based at least in part on the level of self-interference at the first device.

Aspect 11: A method for wireless communications at a first device, comprising: identifying that the first device is scheduled to receive a signal from a second device over a channel between the first device and the second device; receiving, from the second device, a report indicating one or more pre-equalization parameters associated with pre-equalization applied by the second device to the signal; receiving, from the second device, the pre-equalized signal over the channel; and decoding the pre-equalized signal based at least in part on the one or more pre-equalization parameters.

Aspect 12: The method of aspect 11, further comprising: transmitting, to the second device, a configuration message indicating the one or more pre-equalization parameters to include in the report, wherein the report indicating the one or more pre-equalization parameters is based at least in part on the configuration message.

Aspect 13: The method of any of aspects 11 through 12, wherein receiving the report indicating the one or more pre-equalization parameters further comprises: receiving, within the report indicating the one or more pre-equalization parameters, an indication that the pre-equalization is applied to the signal.

Aspect 14: The method of any of aspects 11 through 13, wherein the one or more pre-equalization parameters are based at least in part on a power delay profile for signals communicated over the channel, and the one or more pre-equalization parameters comprise a number of taps of the power delay profile, a value of each tap of the power delay profile, a time-domain location of each tap of the power delay profile, a largest tap of the power delay profile, or a combination thereof.

Aspect 15: The method of any of aspects 11 through 14, wherein receiving the report further comprises: receiving the report aperiodically or periodically, or any combination thereof, based at least in part on a Doppler spread associated with the channel.

Aspect 16: The method of any of aspects 11 through 15, further comprising: receiving, from the second device, a second report indicating a second set of one or more pre-equalization parameters, wherein the second set of one or more pre-equalization parameters are based at least in part on a level of self-interference at the second device; receiving, from the second device, a second pre-equalized signal over the channel; and applying equalization to the second pre-equalized signal based at least in part on the second set of one or more pre-equalization parameters.

Aspect 17: A method for wireless communications at a first device, comprising: determining a condition of a channel between the first device and a second device, wherein the first device is scheduled to transmit a signal to the second device over the channel; applying pre-equalization to the signal based at least in part on one or more pre-equalization parameters, the one or more pre-equalization parameters being based at least in part on the condition of the channel; transmitting, to a third device, a report indicating the one or more pre-equalization parameters associated with the pre-equalized signal, the third device being different from the second device; and transmitting, to the second device, the pre-equalized signal over the channel.

Aspect 18: The method of aspect 17, wherein transmitting the report indicating the one or more pre-equalization parameters further comprises: transmitting, within the report to the third device, an indication that the first device is transmitting the signal to the second device and an indication that the pre-equalization is applied to the signal.

Aspect 19: The method of any of aspects 17 through 18, further comprising: receiving, from the third device, a request for the first device to transmit the report indicating the one or more pre-equalization parameters, the request included in a radio resource control message, wherein transmitting the report to the third device is based at least in part on the request.

Aspect 20: The method of any of aspects 17 through 19, further comprising: transmitting, to the second device, the report indicating the one or more pre-equalization parameters associated with the pre-equalized signal, the report comprising an indication that the pre-equalization is applied to the signal.

Aspect 21: The method of aspect 20, further comprising: receiving, from the second device, a request for the first device to transmit the report indicating the one or more pre-equalization parameters, the request included in a radio resource control message, wherein transmitting the report to the second device is based at least in part on the request.

Aspect 22: The method of any of aspects 17 through 21, further comprising: determining a power delay profile for signals communicated over the channel, the power delay profile corresponding to the condition of the channel; and determining the one or more pre-equalization parameters based at least in part on the determined power delay profile, wherein the one or more pre-equalization parameters comprise a number of taps of the power delay profile, a value of each tap of the power delay profile, a time-domain location of each tap of the power delay profile, a largest tap of the power delay profile, or a combination thereof.

Aspect 23: The method of aspect 22, wherein the value of each tap comprise differential values based at least in part on a value of the largest tap, and the time-domain location of each tap comprise differential values based at least in part on a time-domain location of the largest tap.

Aspect 24: The method of aspect 22, wherein the value of each tap comprise differential values based at least in part on a value of an adjacent tap, and the time-domain location of each tap comprise differential values based on a time-domain location of the adjacent tap.

Aspect 25: The method of any of aspects 17 through 24, wherein transmitting the report further comprises: transmitting the report aperiodically or periodically, or any combination thereof, based at least in part on a Doppler spread associated with the channel.

Aspect 26: The method of any of aspects 17 through 25, wherein a size of the report is based at least in part on a number of taps of a power delay profile of the pre-equalized signal and based at least in part on a number of antennas used by the first device to transmit the pre-equalized signal.

Aspect 27: A method for wireless communications at a first device, comprising: receiving, from a second device, a report indicating a transmission of a pre-equalized signal from the second device to a third device, the report indicating one or more pre-equalization parameters associated with the pre-equalized signal; receiving the pre-equalized signal that is transmitted from the second device to the third device over a channel between the second device and the third device; and performing one or more interference cancellation procedures for interference corresponding to the pre-equalized signal, the one or more interference cancellation procedures based at least in part on the report.

Aspect 28: The method of aspect 27, further comprising: transmitting, to the second device, a request for the second device to transmit the report indicating the one or more pre-equalization parameters, the request included in a radio resource control message, wherein receiving the report is based at least in part on the request.

Aspect 29: The method of any of aspects 27 through 28, wherein the one or more pre-equalization parameters are based at least in part on a power delay profile for signals communicated over the channel, and the one or more pre-equalization parameters comprise a number of taps of the power delay profile, a value of each tap of the power delay profile, a time-domain location of each tap of the power delay profile, a largest tap of the power delay profile, or a combination thereof.

Aspect 30: The method of any of aspects 27 through 29, wherein receiving the report further comprises: receiving the report periodically or aperiodically, or any combination thereof, based at least in part on a Doppler spread associated with the channel.

Aspect 31: An apparatus for wireless communications at a first device, comprising a processor; memory coupled with the processor; and instructions stored in the memory and executable by the processor to cause the apparatus to perform a method of any of aspects 1 through 10.

Aspect 32: An apparatus for wireless communications at a first device, comprising at least one means for performing a method of any of aspects 1 through 10.

Aspect 33: A non-transitory computer-readable medium storing code for wireless communications at a first device, the code comprising instructions executable by a processor to perform a method of any of aspects 1 through 10.

Aspect 34: An apparatus for wireless communications at a first device, comprising a processor; memory coupled with the processor; and instructions stored in the memory and executable by the processor to cause the apparatus to perform a method of any of aspects 11 through 16.

Aspect 35: An apparatus for wireless communications at a first device, comprising at least one means for performing a method of any of aspects 11 through 16.

Aspect 36: A non-transitory computer-readable medium storing code for wireless communications at a first device, the code comprising instructions executable by a processor to perform a method of any of aspects 11 through 16.

Aspect 37: An apparatus for wireless communications at a first device, comprising a processor; memory coupled with the processor; and instructions stored in the memory and executable by the processor to cause the apparatus to perform a method of any of aspects 17 through 26.

Aspect 38: An apparatus for wireless communications at a first device, comprising at least one means for performing a method of any of aspects 17 through 26.

Aspect 39: A non-transitory computer-readable medium storing code for wireless communications at a first device, the code comprising instructions executable by a processor to perform a method of any of aspects 17 through 26.

Aspect 40: An apparatus for wireless communications at a first device, comprising a processor; memory coupled with the processor; and instructions stored in the memory and executable by the processor to cause the apparatus to perform a method of any of aspects 27 through 30.

Aspect 41: An apparatus for wireless communications at a first device, comprising at least one means for performing a method of any of aspects 27 through 30.

Aspect 42: A non-transitory computer-readable medium storing code for wireless communications at a first device, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first device, comprising:

determining, by the first device, a condition of a channel between the first device and a second device, wherein the first device is scheduled to transmit a signal to the second device over the channel;

applying, by the first device, pre-equalization to the signal based at least in part on one or more pre-equalization parameters, the one or more pre-equalization parameters being based at least in part on the condition of the channel and a power delay profile for signals communicated over the channel;

transmitting, to the second device, a report indicating the one or more pre-equalization parameters associated with the pre-equalized signal, wherein at least one of the one or more pre-equalization parameters indicates a time-domain location of at least one tap of the power delay profile; and transmitting, to the second device, the pre-equalized signal over the channel.

2. The method of claim 1, further comprising:
receiving, from the second device, a configuration message indicating the one or more pre-equalization parameters to include in the report, wherein the report indicating the one or more pre-equalization parameters is based at least in part on the configuration message.

3. The method of claim 1, wherein transmitting the report indicating the one or more pre-equalization parameters further comprises:
transmitting, within the report indicating the one or more pre-equalization parameters, an indication that the pre-equalization is applied to the signal.

4. The method of claim 1, further comprising:
transmitting, to a third device, a second report indicating that the first device applied pre-equalization to the signal over the channel, the second report indicating that the pre-equalization is based at least in part on the channel between the first device and the second device, wherein the third device is different from the second device.

5. The method of claim 1, further comprising:
determining the one or more pre-equalization parameters based at least in part on the power delay profile, wherein the one or more pre-equalization parameters further comprise a number of taps of the power delay profile, a value of each tap of the power delay profile, a largest tap of the power delay profile, or a combination thereof.

6. The method of claim 1, wherein:
the time-domain location of the at least one tap comprises a differential value based at least in part on a time-domain location of a largest tap of the power delay profile.

7. The method of claim 1, wherein:
the time-domain location of the at least one tap comprises a differential value based at least in part on a time-domain location of an adjacent tap of the power delay profile.

8. The method of claim 1, wherein transmitting the report further comprises:
transmitting the report aperiodically or periodically, or any combination thereof, based at least in part on a Doppler spread associated with the channel.

9. The method of claim 1, further comprising:
identifying one or more additional pre-equalization parameters that are different from the one or more pre-equalization parameters included in the report; and
transmitting, to the second device, a second report indicating the identified one or more additional pre-equalization parameters based at least in part on the one or more additional pre-equalization parameters being different from the one or more pre-equalization parameters.

10. The method of claim 1, further comprising:
determining a level of self-interference at the first device based at least in part on the first device operating according to a full-duplex communications mode;
applying pre-equalization to the signal based at least in part on the determined level of self-interference at the first device; and
transmitting, to the second device, a second report indicating a second set of one or more pre-equalization parameters, wherein the second set of one or more pre-equalization parameters are based at least in part on the level of self-interference at the first device.

11. A method for wireless communications at a first device, comprising:
identifying that the first device is scheduled to receive a signal from a second device over a channel between the first device and the second device;
receiving, from the second device, a report indicating one or more pre-equalization parameters associated with pre-equalization applied by the second device to the signal, wherein at least one of the one or more pre-equalization parameters indicates a time-domain location of at least one tap of a power delay profile for signals communicated over the channel;
receiving, from the second device, the pre-equalized signal over the channel; and
decoding, by the first device, the pre-equalized signal based at least in part on the one or more pre-equalization parameters.

12. The method of claim 11, further comprising:
transmitting, to the second device, a configuration message indicating the one or more pre-equalization parameters to include in the report, wherein the report indicating the one or more pre-equalization parameters is based at least in part on the configuration message.

13. The method of claim 11, wherein receiving the report indicating the one or more pre-equalization parameters further comprises:
receiving, within the report indicating the one or more pre-equalization parameters, an indication that the pre-equalization is applied to the signal.

14. The method of claim 11, wherein:
the one or more pre-equalization parameters further comprise a number of taps of the power delay profile, a value of each tap of the power delay profile, a largest tap of the power delay profile, or a combination thereof.

15. The method of claim 11, wherein receiving the report further comprises:
receiving the report aperiodically or periodically, or any combination thereof, based at least in part on a Doppler spread associated with the channel.

16. The method of claim 11, further comprising:
receiving, from the second device, a second report indicating a second set of one or more pre-equalization parameters, wherein the second set of one or more pre-equalization parameters are based at least in part on a level of self-interference at the second device;
receiving, from the second device, a second pre-equalized signal over the channel; and
applying equalization to the second pre-equalized signal based at least in part on the second set of one or more pre-equalization parameters.

17. A method for wireless communications at a first device, comprising:
determining, by the first device, a condition of a channel between the first device and a second device, wherein the first device is scheduled to transmit a signal to the second device over the channel;
applying, by the first device, pre-equalization to the signal based at least in part on one or more pre-equalization parameters, the one or more pre-equalization parameters being based at least in part on the condition of the channel and a power delay profile for signals communicated over the channel;
transmitting, to a third device, a report indicating the one or more pre-equalization parameters associated with the pre-equalized signal, wherein at least one of the one or more pre-equalization parameters indicates a time-domain location of at least one tap of the power delay profile, the third device being different from the second device; and transmitting, to the second device, the pre-equalized signal over the channel.

18. The method of claim 17, wherein transmitting the report indicating the one or more pre-equalization parameters further comprises:

transmitting, within the report to the third device, an indication that the first device is transmitting the signal to the second device and an indication that the pre-equalization is applied to the signal.

19. The method of claim 17, further comprising:

receiving, from the third device, a request for the first device to transmit the report indicating the one or more pre-equalization parameters, the request included in a radio resource control message, wherein transmitting the report to the third device is based at least in part on the request.

20. The method of claim 17, further comprising:

transmitting, to the second device, the report indicating the one or more pre-equalization parameters associated with the pre-equalized signal, the report comprising an indication that the pre-equalization is applied to the signal.

21. The method of claim 20, further comprising:

receiving, from the second device, a request for the first device to transmit the report indicating the one or more pre-equalization parameters, the request included in a radio resource control message, wherein transmitting the report to the second device is based at least in part on the request.

22. The method of claim 17, further comprising:

determining the one or more pre-equalization parameters based at least in part on the power delay profile, wherein the one or more pre-equalization parameters further comprise a number of taps of the power delay profile, a value of each tap of the power delay profile, a largest tap of the power delay profile, or a combination thereof.

23. The method of claim 17, wherein:

the time-domain location of the at least one tap comprises a differential value based at least in part on a time-domain location of a largest tap of the power delay profile.

24. The method of claim 17, wherein:

the time-domain location of the at least one tap comprises a differential value based at least in part on a time-domain location of an adjacent tap of the power delay profile.

25. The method of claim 17, wherein transmitting the report further comprises:

transmitting the report aperiodically or periodically, or any combination thereof, based at least in part on a Doppler spread associated with the channel.

26. The method of claim 17, wherein a size of the report is based at least in part on a number of taps of a power delay profile of the pre-equalized signal and based at least in part on a number of antennas used by the first device to transmit the pre-equalized signal.

27. A method for wireless communications at a first device, comprising:

receiving, from a second device, a report indicating a transmission of a pre-equalized signal from the second device to a third device, the report indicating one or more pre-equalization parameters associated with the pre-equalized signal, wherein at least one of the one or more pre-equalization parameters indicates a time-domain location of at least one tap of a power delay profile for signals communicated over a channel between the second device and the third device;

receiving the pre-equalized signal that is transmitted from the second device to the third device over the channel between the second device and the third device; and performing, by the first device, one or more interference cancellation procedures for interference corresponding to the pre-equalized signal, the one or more interference cancellation procedures based at least in part on the report.

28. The method of claim 27, further comprising:

transmitting, to the second device, a request for the second device to transmit the report indicating the one or more pre-equalization parameters, the request included in a radio resource control message, wherein receiving the report is based at least in part on the request.

29. The method of claim 27, wherein:

the one or more pre-equalization parameters further comprise a number of taps of the power delay profile, a value of each tap of the power delay profile, a largest tap of the power delay profile, or a combination thereof.

30. The method of claim 27, wherein receiving the report further comprises:

receiving the report periodically or aperiodically, or any combination thereof, based at least in part on a Doppler spread associated with the channel.

* * * * *